United States Patent [19]

Ikemori

[11] 4,310,222
[45] * Jan. 12, 1982

[54] RETRO-FOCUS TYPE WIDE ANGLE LENS

[75] Inventor: Keiji Ikemori, Yokohama, Japan

[73] Assignee: Canon Kabushiki Kaisha, Kanagawa, Japan

[*] Notice: The portion of the term of this patent subsequent to Sep. 5, 1995, has been disclaimed.

[21] Appl. No.: 31,613

[22] Filed: Apr. 18, 1979

Related U.S. Application Data

[63] Continuation-in-part of Ser. No. 845,579, Oct. 26, 1977, abandoned.

[30] Foreign Application Priority Data

Oct. 29, 1976 [JP] Japan .................. 51-130334
Apr. 21, 1978 [JP] Japan .................. 53-47511

[51] Int. Cl.$^3$ .............. G02B 13/04; G02B 9/64
[52] U.S. Cl. ........................ 350/432; 350/458
[58] Field of Search .................. 350/432, 458

[56] References Cited

U.S. PATENT DOCUMENTS

| | | | |
|---|---|---|---|
| 3,583,791 | 6/1971 | Mori | 350/214 |
| 3,966,306 | 6/1976 | Okudaira | 350/214 |
| 4,111,558 | 9/1978 | Ikemori | 350/214 |
| 4,116,536 | 9/1978 | Moscovich | 350/214 |

Primary Examiner—Conrad J. Clark
Attorney, Agent, or Firm—Toren, McGeady & Stanger

[57] ABSTRACT

The present invention relates to a retro-focus type wide angle lens which is compact despite its remarkably large field of view and well compensated for various aberrations.

This lens system consists of the first divergent lens group and the second convergent lens group in sequence from the side of the object, whereby the first divergent group consists of a plural number of meniscus lenses convex to the object in such a manner that the distortion is compensated for and a compact lens system is realized by forming the object side surface of the substantially zero first order power lens in the meniscus lenses non spherical. The meniscus lens with non-spherical surface is formed from plastic material, resulting in an inexpensive and light retro-focus type wide angle lens.

Further, the second convergent lens group is divided into two lens groups with a diaphragm as boundary, whereby in the object side lens group a meniscus lens concave to the object and a biconvex lens are arranged in sequence from the diaphragm to the object side so as to form an air lens having a divergent effect between both lenses, while in the image plane side lens group a lens concave to the image is arranged so as to eliminate the astigmatism and the spherical aberration.

19 Claims, 47 Drawing Figures

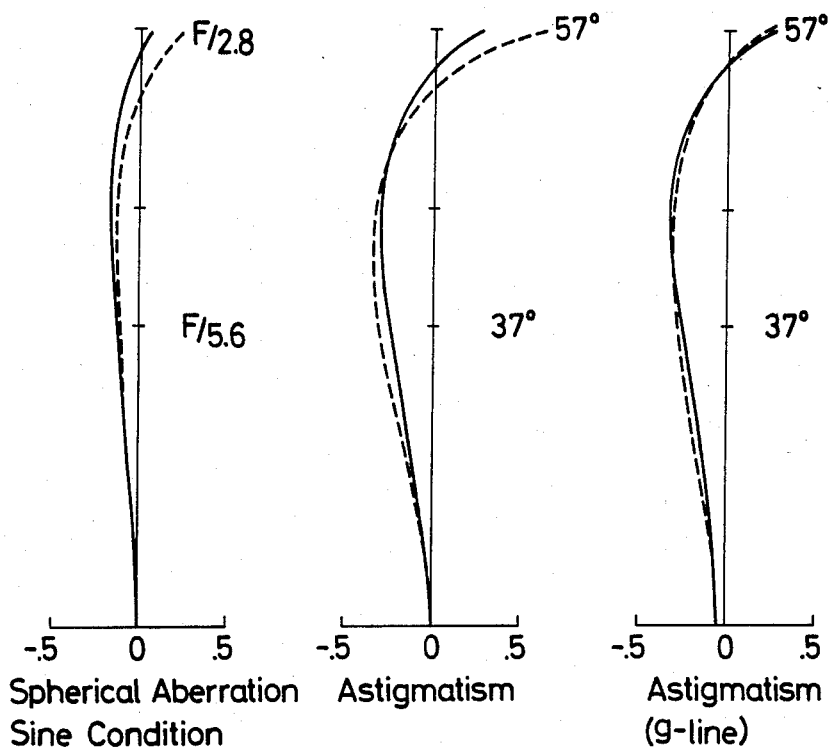
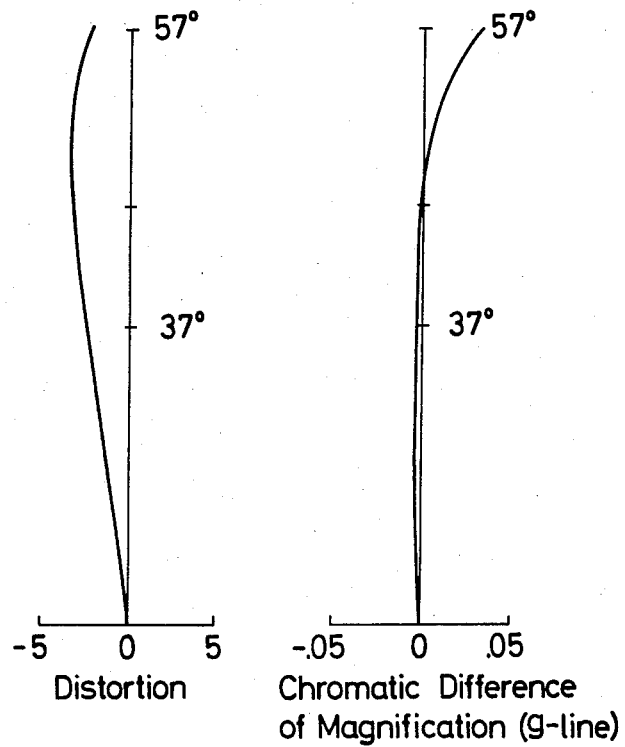

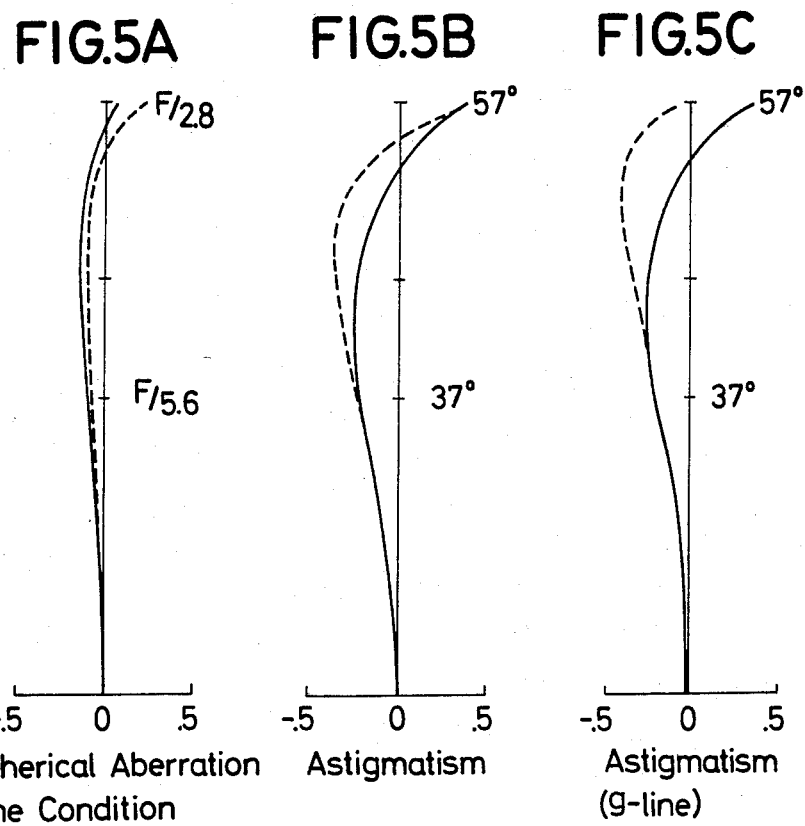

Spherical Aberration
Sine Condition

Astigmatism

Astigmatism
(g-line)

Distortion

Chromatic Difference
of Magnification (g-line)

Spherical Aberration
Sine Condition

Astigmatism

Astigmatism
(g-line)

Distortion

Chromatic Difference
of Magnification (g-line)

Spherical Aberration
Sine Condition

Astigmatism

Astigmatism (g-line)

Distortion

Chromatic Difference of Magnification (g-line)

Spherical Aberration
Sine Condition

Astigmatism

Astigmatism
(g-line)

Distortion

Chromatic Difference
of Magnification (g-line)

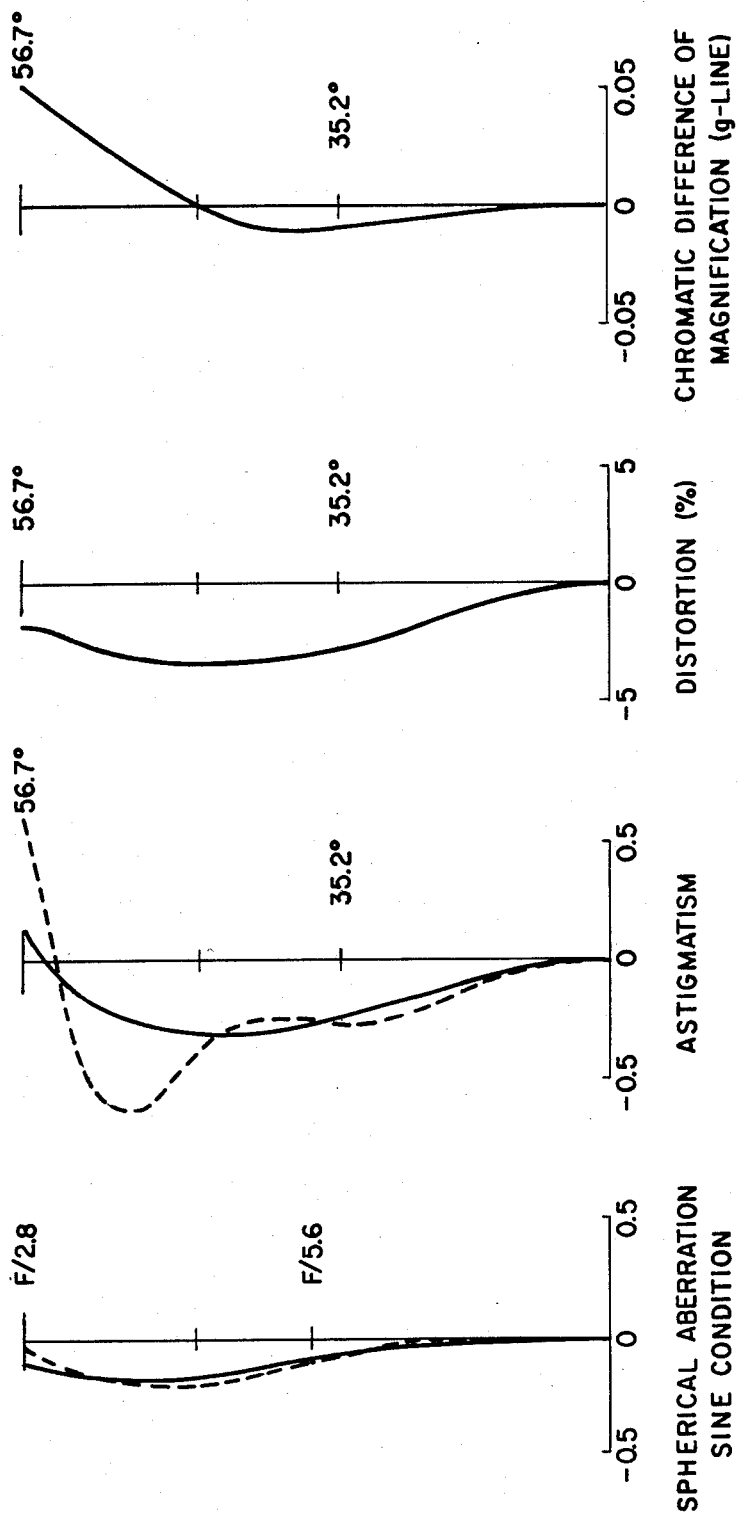

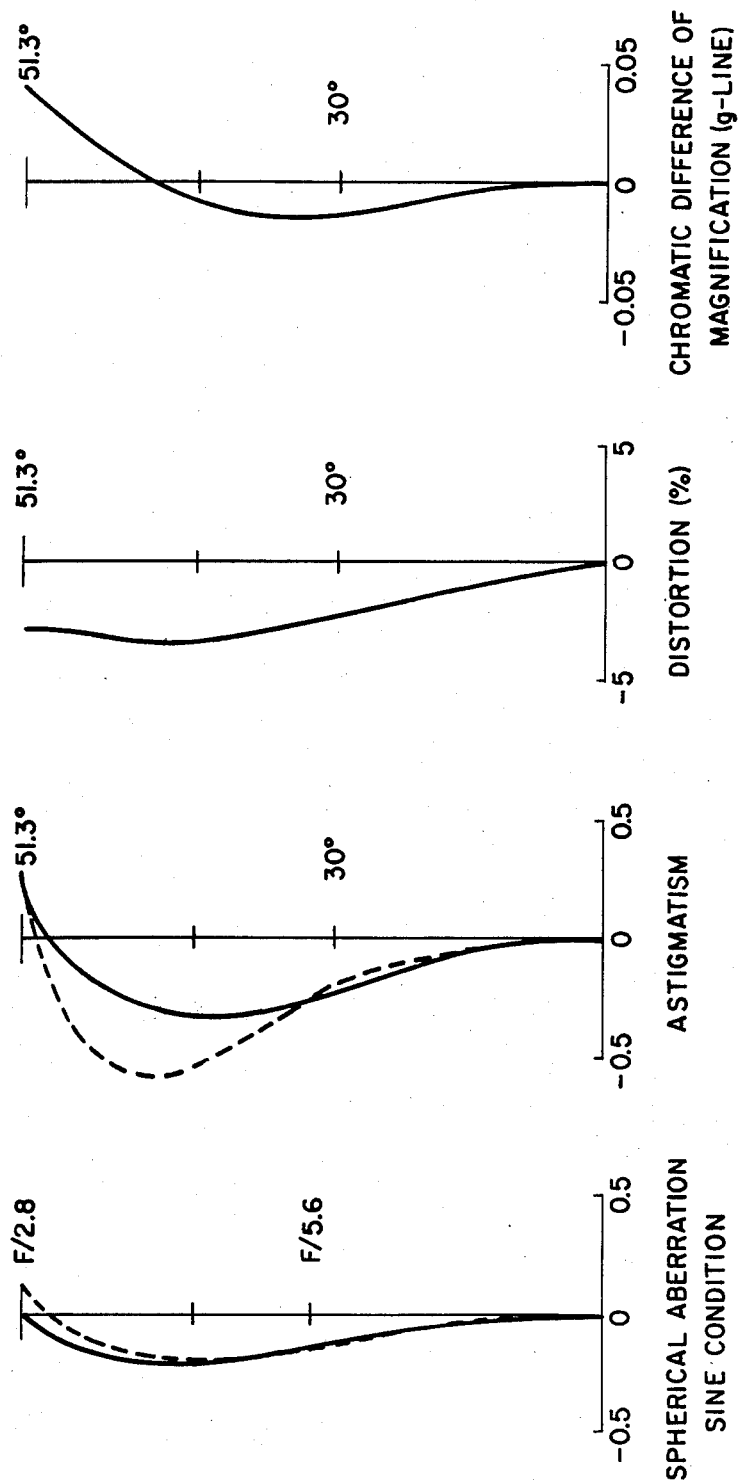

RETRO-FOCUS TYPE WIDE ANGLE LENS

CROSS REFERENCE TO RELATED APPLICATION:

This application is a continuation-in-part of our co-pending application Ser. No. 845,579 filed on Oct. 26, 1977 and now abandoned.

BACKGROUND OF THE INVENTION

The present invention relates to a retro-focus type ultra wide angle lens which is well compensated for various aberrations by the use of a non-spherical optical system.

Until now various kinds of retro-focus type wide angle lenses have been known. In the retro-focus type lens system it is desirable to have a sufficiently long back focus, while the compensation of the distortion, the astigmatism or the coma is difficult because of the non-symmetry of the lens system. It is remarkably difficult to compensate for both the distortion and the astigmatism at the same time. Consequently, the larger the field of view is, the higher the number of the lenses is increased in order to compensate various aberrations.

It is well known to introduce a non-spherical surface in order to compensate distortion without complicating the lens system. Because the non-spherical surface influences other aberrations, however, care should be taken in designing the non-spherical surface. In order to compensate the distortion well it is desirable that the non-spherical surface is provided at the position in the lens system at which the distance between the optical axis and the off-axial principal ray with the maximum field of view is as large as possible.

The reason is as follows. Hereby, let $\nu$ represent the number of respective lens surfaces, $\overline{h\nu}$ the height of the position on the $\nu$th surface at which the on-axial (paraxial) ray crosses the surface, $h\nu$ the height of the position on the $\nu$th surface at which the principal ray (a ray from the object point to the center of the diaphragm) crosses the surface.

I (Spherical aberration with the third grade aberration coefficient)$= \Sigma I\nu$,
II (Coma)$= \Sigma II\nu$,
III (Astigmatism)$= \Sigma III\nu$,
V (Distortion)$= \Sigma V\nu$ The amount which the non-spherical element contributes to respective aberration is proportional to $h^4\nu$ with reference to $I\nu$, to $h^3\nu\overline{h\nu}$ with reference to $II\nu$, to $h^2\nu\overline{h\nu}^2$ with reference to $III\nu$ and to $h\nu\overline{h\nu}^3$ ($h\nu\overline{h\nu}^5$ in fifth order distortions) with reference to $V\nu$.

As is understood from the above, the surface with large $\overline{h\nu}$ but small $h\nu$ should be formed non-spherically in order to compensate the distortion V by using a non-spherical surface, keeping the influence or other aberrations as small as possible.

Further, even in the range of the higher orders than the fifth, the distortion is proportional to the height $\overline{h\nu}$, so that it is effective to form the surface with the large $h\nu$ non-spherical in order to compensate the distortion.

An example of a retro-focus type wide angle lens in which the distortion is compensated with a non-spherical surface while the astigmatism to be increased as the result is suppressed is disclosed in the U.S. Pat. No. 3,832,035. In case of this example any optical surface in the front divergent lens system is made non-spherical in order to eliminate the distortion, while the astigmatism is compensated by limiting the sum of the thickness at the center of a determined number of lenses.

However, generally in case of the retro-focus type wide angle lenses, as is explained above, the larger the field is, the greater the number of the lenses is increased in order to compensate for various aberrations so that the realization of a compact wide angle lens is desired, for which conventionally no particular consideration has been paid.

When a lens having a non-spherical surface is used in a lens system, more labor and time are required for grinding the lens surface to a non-spherical form than for grinding the lens to a spherical form and thus the manufacturing cost of the lens system will be very high. However, if the lens having a non-spherical surface is made of plastic, the manufacturing cost will be markedly lowered, because the plastic lens can be formed by molds and only several accurate molds make possible a mass production in a short period of time.

However, a plastic lens has the following two defects. First, plastic shows a larger degree of thermal expansion and contraction than glass, and changes in the thickness of the plastic lens produce adverse effects on the total focal length and the back focus of the whole lens system. Secondly, the plastic lens made by molding has a poor surface accuracy as compared with a glass lens. This induces deterioration of the aberration.

A lens system using a plastic lens having a non-spherical surface is disclosed in British Pat. No. 1,388,723, but it has been impossible to provide a high-performance lens system using a plastic lens due to the above-mentioned defects.

SUMMARY OF THE INVENTION

A purpose of the present invention is to offer a retro-focus type wide angle lens in which the distortion is compensated despite its remarkably large field of view, while other aberrations are also well compensated.

Another purpose of the present invention is to offer a cheap and light retro-focus type wide angle lens, while the distortion and other aberrations are well compensated.

In the retro-focus type according to the present invention, the above object is achieved by effectively arranging a plastic lens containing a non-spherical surface.

BRIEF DESCRIPTION OF THE DRAWINGS

FIGS. 3A to 3E show the respective aberrations of the first embodiment.

FIGS. 5A to 5E show respective aberrations of the second embodiment.

FIGS. 15A to 15D show the respective aberrations of the seventh embodiment.

FIGS. 17A to 17D show respective aberrations of the eighth embodiment.

DETAILED DESCRIPTION OF THE INVENTION

Figure 1:
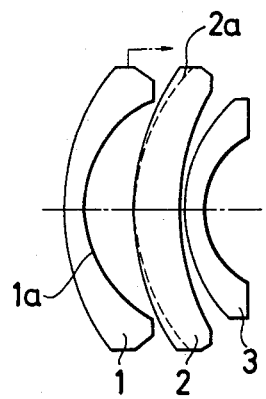
FIG. 1 shows an embodiment of the first divergent lens group of the retro-focus type ultra wide angle lens of the present invention.

The retro-focus type wide angle lens in accordance with the present invention is divided into a first divergent lens group and a second convergent lens group in sequence from the object side. In the embodiments to be explained later the first divergent lens group is separated from the second convergent lens group at a position at which the height of the paraxially traced light beam on the optical axis is 1.4 with an incident height of 1.0.

In order to well compensate the distortion, which is the purpose of the present invention, it is recommended to provide the non-spherical surface at the position at which the distance between the optical axis and the principal ray with the maximum angle of field is as large as possible. When using wide angle lenses among the so-called photographic objective lenses whose back focus is longer than 1.7 times of the effective total length, it is recommended to provide the distortion compensating non-spherical surface in the first divergent lens group in which a surface with maximum $\overline{h\nu}$ but small $h\nu$ exists. Further, especially when the field of view, is remarkably large in a retro-focus type wide angle lens having a non-spherical surface, it is possible to decrease the diameter of the front lens greatly by shortening the air gaps in the first divergent lens group. In consequence, the second purpose of the present invention can be achieved by means of the following two measures. Namely, in order to realize a compact wide angle lens, it is essential that immediately in front of the lens with a non-spherical surface a negative meniscus lens having a surface convex to the object should be provided and the radius of curvature of the lens surface facing the non-spherical surface of the meniscus lens should be smaller than the radius of paraxial curvature of the non-spherical lens.

Secondly, a conventional non-spherical lens such as the retro-focus type wide angle lens disclosed in U.S. Pat. No. 3,832,035 has paraxially a considerable divergent effect, while in accordance with the present invention a substantially almost afocal (substantially zero first order power) lens is used to the one to be provided with a non-spherical surface. Thus, the divergent effect of each concave lens in accordance with the present invention is weaker even if the number of the concave meniscus lenses in the first divergent lens group in accordance with the present invention is equal to that of the conventional first divergent lens group where the divergent effect in the first divergent lens group is chosen equal to that in the conventional first divergent lens.

This enables the reduction of the air gaps in the first divergent lens group, or the reduction of the number of lenses and further the reduction of the diameter of the front lens. Further, the higher order aberrations take place lens often, which serves to the improvement of the efficiency. Namely, the fact that the non-spherical lens of the barrel distortion compensation is paraxially almost afocal includes many optically important factors for the realization of the lens system, the improvement of the efficiency, the realization of a large field of view and so on.

In the retro-focus type ultra wide angle lens group of the present invention, each number of the first divergent lens group consists of meniscus lenses convex to the object, namely the 1-1th divergent lens group whose at least one meniscus lens has a negative refractive index, the 1-2th lens group having at least one meniscus lens with an absolute value of the paraxial focal length twenty five times or more as large as the composed focal length of the lens system and the 1-3th divergent lens group having more than one meniscus lenses with a negative refractive index in sequence from the side of the object. The meniscus lens arranged in the 1-2th lens group is the one nearly afocal, whereby the surface nearest to the object, of the 1-2th lens group is non-spherical and represented as follows:

$$X = R\left\{1 - \left(1 - \frac{H^2}{R^2}\right)^{\frac{1}{2}}\right\} + V$$

$V = AH^2 + BH^4 + CH^6 + DH^8 + EH^{10}$

Under the following definitions:
- R: Paraxial radius of curvature
- H: Coordinate perpendicular to the optical axis
- X: Coordinate in alignment with the optical axis, the direction along which the light beam advances is supposed positive while the summit of the plane is supposed the origin
- A–E: non-spherical coefficient and under the condition $B > 0$, V is increased along as $H(0 < H < R)$ increases. In other words, the non-spherical surface is so shaped that the more distant it is from the optical axis toward the circumference of the lens, the greater the displacement of the non-spherical surface from the spherical surface, namely the more the polished the surface is. Further the radius of curvature of the surface facing the above non-spherical surface, of the 1-1th divergent lens group is smaller than the paraxial radius of curvature R of the non-spherical surface.

Further, the second convergent lens group consists of the 2-1st convergent lens group and the 2-2nd convergent lens group in sequence from the side of the object so as to include the diaphragm between them. In the 2-1st convergent lens group at least one negative meniscus lens whose concave surface is facing the object is arranged immediately in front of the side of the diaphragm that faces the object, while a biconvex lens is provided at the side of the negative meniscus lens facing the object. The air lens formed between the negative meniscus lens and the biconvex lens has a divergent effect. Further, the 2-2nd convergent lens group has at least one divergent surface concave to the image plane.

Further, it is desired that the distance between the diaphragm and the surface at the side of the image plane, of the biconvex lens in the afore mentioned 2-1st convergent lens should be 0.15 times or more but 0.85 times or less as large as the effective focal length of the wide angle lens.

It is possible that by constituting the first divergent lens group only with the meniscus lenses convex to the object no remarkably large light incident angle or light exiting out angle is involved when the light beam outside of the axis reaching the circumference of the picture plane and having a particularly large incident angle to the first surface penetrates the lens group, which is connected with the reduction of the diameter of the lens and the reasonable compensation of aberration.

The non-spherical surface of the nearly afocal meniscus lens provided in the 1-2th lens group is so shaped that the closer it is to the circumference of the lens, the greater is the displacement of the non-spherical surface from the spherical surface. This means that the lens with non-spherical surface is almost afocal near the optical axis while the convergence is increased toward the circumference of the picture plane, which is quite effective for a reasonable compensation of the barrel distortion to be remarkably emphasized toward the circumference of the picture plane.

First, it is essential to keep the distortion of the third aberration coefficient as small as possible, for which at least B should be greater than zero.

FIG. 1 shows an embodiment of the first divergent lens group in accordance with the present invention, whereby each of the 1-1th divergent lens group 1, the 1-2th lens group 2 and the 1-3th divergent lens group 3 consists of only the lens. The non-spherical surface 2a is shown with a dotted line, whereby the radius curvature of the lens plane 1a opposed the non-spherical surface 2a is smaller than that of the surface 2a. With this shape of the non-spherical surface, the air gap between the image side 1a of the negative meniscus lens 1 and the non-spherical surface 2a is increased toward the circumference of the lens, as compared with the ordinary spherical lens. This means that the lens 1 can be brought closer to the non-spherical lens 2, which allows the reduction of the total lens length and of the diameter of the front lens.

In the present invention, the non-spherical lens to be provided in the 1-2th lens group so as to compensate the barrel distortion should paraxially be nearly afocal, whereby as a standard the focal length of the non-spherical lens is twenty-five or more times as large as that of the total lens system. The paraxial refracting power of this non-spherical lens is of weak convergence in the first embodiment, of weak divergence in the second and third embodiment, of weak convergence in the fourth embodiment and of considerably weak convergence in the fifth and the sixth embodiments. Consequently, the non-spherical lens in the 1-2th lens group of the present invention has paraxially little refracting power, whereby the more distant it is from the optical axis toward the circumference of the lens, the more convergence, practically takes place thanks to the effect of the non-spherical surface.

Further, a negative meniscus lens convex to the object is located at the object side of the non-spherical lens so that at first a light beam with a remarkably large incident angle out of the optical axis is at first refracted by means of the negative meniscus lens, in such a manner that the angle between the light beam and the optical axis is decreased, and enters into the non-spherical lens. Thus, it never happens that the chromatic difference of magnification (g-line) should become extremely larger near the largest picture angle.

Hereby, the barrel distortion is compensated by means of the introduction of a non-spherical surface. However, it can not always be said that aberrations other than the distortion are never adversely influenced, whereby the astigmatism is worst influenced in such a manner that the amount is proportional to the compensation amount of the distortion. Thus, if within the range of the above mentioned conditions the distortion is compensated in the state in which the compensation amount of the distortion is small, the deterioration of the astigmatism is permissible. However, in order to further increase the picture angle while keeping the compactness, it is necessary to compensate the barrel distortion by increasing the amount of deviation of the non-spherical surface as stated above, whereby the compensation of the astigmatism becomes insufficient at the same time. For example in the present embodiment, the astigmatism is no longer permissible when the picture angle is larger than 99.8°. Further, in order to obtain a smaller F value (for example F1:2.8 or more as in case of the present embodiment) while keeping a good image forming ability at the circumference of the picture plane, the afore mentioned conditions are also needed for the second convergent lens group.

Namely, the second convergent lens group consists of the 2-1st convergent lens group and the 2-2nd convergent lens group in sequence from the object side so as to include the diaphragm between them. Immediately in front of the diaphragm in the 2-1st convergent lens group at least one negative meniscus lens having a surface concave to the object is provided, while a biconvex lens is provided an the object side of this negative meniscus lens in such a manner that a divergent air lens is formed between the negative meniscus lens and the biconvex lens. When the negative meniscus lens consists of a plural number of lenses, the biconvex lens and the last meniscus lens at the object side may be cemented to each other. In this case, the cemented surfaces form a divergent surface with no air gap. The 2-2nd convergent lens group includes at least one divergent surface concave to the object, whereby this divergent surface may be either exposed to the air or cemented to another surface.

By providing a divergent air lens or a divergent surface exercising an excessive spherical aberration respectively in the 2-1st and the 2-2nd convergent lens group, the balance of the spherical aberration in the total lens system can be kept by means of the amount of the spherical aberrations whose respective divergence is small. This enables the reduction of the spherical aberration, namely the realization of a higher efficiency.

In the same way, as in case of the afore mentioned aberrations, the astigmatism is proportional to $h\nu^2\overline{h\nu}^2$ while the distortion is almost proportional to $h\nu\overline{h\nu}^3$.

Thus, in accordance with the present invention, the afore mentioned negative meniscus lens in the 2-1st convergent lens group is arranged between the diaphragm and the object side surface of the biconvex lens and a little closer to the diaphragm, whereby the object side surface of the biconvex is between 0.15 f and 0.85 f from the diaphragm. Hereby, f is the focal length of the total lens system. Thus, this concave meniscus lens is large in $h\nu(+)$ and small in $\overline{h\nu}(-)$ to some extent so that practically no barrel distortion takes place while the astigmatism is emphasized. Further by forming this concave lens as a meniscus lens concave to the object, the light beam out of the optical axis is incident on the lens at a considerably large angle so that astigmatism is not emphasized on the light beam near the center while the greater the distance of the beam from the optical axis, the more emphasized the astigmatism is.

Thus, when the above mentioned negative meniscus lens is within 0.15 f from the diaphragm, $\overline{h\nu}$ is nearly 0 so that practically no astigmatism takes place while when it is beyond 0,85 f from the diaphragm, the astigmatism is emphasized already from the neighborhood of the central intermediate picture angle, whereby a large barrel distortion also takes place in such a manner that a reasonable compensation of the aberration as a whole is no longer possible. Further in case of the conventional retro-focus type ultra wide angle lens, there is a general tendency that the astigmatism for the light beam (for example g-line) with a wave length shorter than the standard wave length is extremely suppressed between the intermediate angle and the maximum angle of field. However, this tendency can also reasonably compensate, by arranging a negative meniscus lens in the above mentioned 2-1st convergent lens group at a proper position within the range of the above mentioned numerical figures as in case of the present invention.

The 2-2nd convergent lens group is arranged behind the diaphragm so that, as is shown in the tables to be explained later, both $h\nu$ and $\overline{h\nu}$ have positive values whereby the value of $h\nu$ is large while that for $\overline{h\nu}$ is small. Thus the divergent surfaces in this lens group emphasize astigmatism and cause pincushion distortion, whereby the amount is larger in the astigmatism than in the distortion.

Thus, even if the astigmatism is allowed to be emphasized, practically no barrel distortion takes place so that a largely emphasized astigmatism may be produced even from the neighborhood of the central light beam.

Further, apart from the above mentioned effects, the divergent surfaces in the 2-2nd convergent lens group keep the necessary amount of the back focus so that it is necessary to keep the divergent effect to some extent, whereby it is desirable that the effect should be born by more than two surfaces particularly if the field of view and the diaphragm aperture are large.

Further, because the astigmatism is produced largely from the intermediate angle of field, the lenses must be concave to the object within a range in which the higher order aberrations are rarely produced. This has the effect of extending the back focus. Therefore, the shortage of the compensation of the astigmatism caused by the compensation of the barrel distortion by increasing the amount of deviation of the non-spherical surface in the first divergent lens group is in the second convergent lens group compensated by providing a negative meniscus lens in the 2-1st convergent lens group near the maximum angle of field and by the divergent surfaces concave to the object in the 2-2nd convergent lens group from an area near the center of an area near the intermediate angle of field. Further, because there is a portion having a divergent effect respectively in the 2-1st and the 2-2nd convergent lens groups, the spherical aberration can be removeably balanced for the whole lens system in which the respective spherical aberrations are small so that it is possible to realize a large diaphragm aperture.

Figure 2:
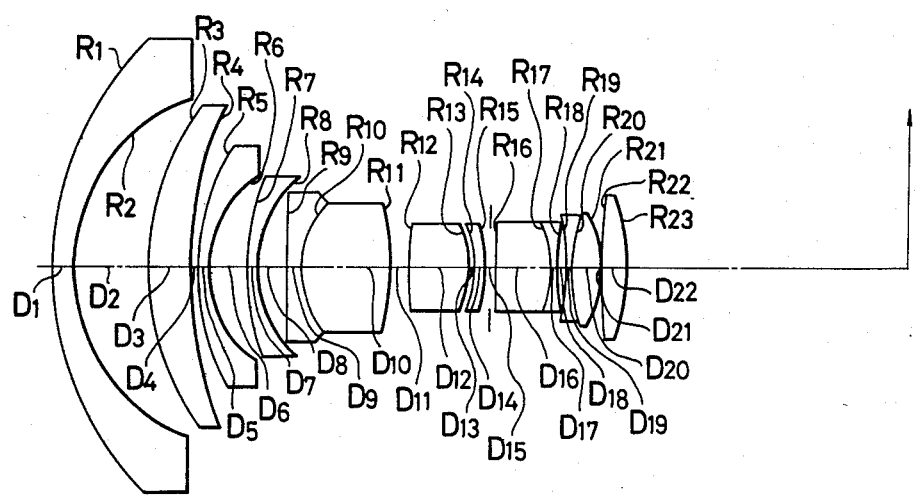
FIG. 2 shows a section of the first embodiment of the lens in accordance with the present invention.

Below the embodiments of the present invention will be explained. FIG. 2 shows a section of the first embodiment of the lens system in accordance with the present invention, whereby a negative meniscus lens (R1, R2) convex an the object side, a paraxial almost afocal non-spherical positive meniscus lens (R3, R4) convex at the object side and two negative meniscus lenses (R5–R8) convex at the object side are provided in sequence from the object side in such a manner that the first divergent lens group consists of the surfaces R1 to R8. Behind the first divergent lens group, a cemented lens convex on both surfaces (R9–R11), a lens convex on both surfaces (R12, R13), a negative meniscus lens (R14, R15) convex on the image side, a diaphragm, two cemented negative meniscus lens (R16–R18) with a concave divergent surface on the image plane side and a convex surface on the object side, a positive meniscus lens (R19–R21) having a cemented concave divergent plane (R20) on the image side and a convex surface on the image plane side and a lens convex on both surfaces (R22, R23) are arranged in sequence from the object side, whereby the second convergent lens group consists of the surfaces R9–R23. FIG. 3 shows the respective aberrations of the first embodiment. Below the data for the first embodiment are given. Hereby the values for $h\nu$ and $h\nu$ are those when the focal distance is 1.

The first embodiment:
 f (focal distance)=14.2; F No.=1:2.8
 bf (back focal distance)=36.6
 Angle of field=114°

| Lens Group | Plane | Focal Distance |
|---|---|---|
| The first divergent lens group | R1–R8 | −1.06f |
| The second convergent lens group | | |
| The 2-1st convergent lens group | R9–R15 | 2.67f |
| The 2-2nd convergent lens group | R16–R23 | 2.37f |

| | Radius of Curvature | Thickness · Distance | | Refractive Index (nd) | | Abbe Number (νd) | | hν | $\overline{h\nu}$ |
|---|---|---|---|---|---|---|---|---|---|
| R 1 | 44.344 | D 1 | 3 | n 1 | 1.6968 | ν 1 | 55.5 | 1.000 | −1.942 |
| R 2 | 25.494 | D 2 | 10.63 | | | | | 0.972 | −1.764 |
| R 3 | 56.952 | D 3 | 6.14 | n 2 | 1.6031 | ν 2 | 60.7 | 1.088 | −1.208 |
| R 4 | 58.976 | D 4 | 1 | | | | | 1.085 | −0.958 |
| R 5 | 32.455 | D 5 | 1.5 | n 3 | 1.6968 | ν 3 | 55.5 | 1.096 | −0.903 |
| R 6 | 15.699 | D 6 | 5.45 | | | | | 1.084 | −0.837 |
| R 7 | 34.226 | D 7 | 1.5 | n 4 | 1.7725 | ν 4 | 49.7 | 1.275 | −0.632 |
| R 8 | 16.356 | D 8 | 4.18 | | | | | 1.280 | −0.588 |
| R 9 | 202.88 | D 9 | 2 | n 5 | 1.6968 | ν 5 | 55.5 | 1.559 | −0.487 |
| R10 | 12.66 | D10 | 12.71 | n 6 | 1.60342 | ν 6 | 38 | 1.631 | −0.457 |
| R11 | −41.964 | D11 | 2.187 | | | | | 2.213 | −0.280 |
| R12 | 56.099 | D12 | 8.88 | n 7 | 1.51742 | ν 7 | 52.3 | 2.304 | −0.223 |
| R13 | −13.786 | D13 | 0.738 | | | | | 2.423 | −0.056 |
| R14 | −12.664 | D14 | 1.2 | n 8 | 1.7725 | ν 8 | 49.7 | 2.371 | −0.034 |
| R15 | −26.477 | D15 | 1.7 | | | | | 2.421 | −0.014 |
| R16 | 140.256 | D16 | 7.98 | n 9 | 1.69895 | ν 9 | 30.1 | 2.427 | 0.035 |
| R17 | −14.608 | D17 | 1 | n10 | 1.62606 | ν10 | 39.1 | 2.386 | 0.170 |

-continued

| Radius of Curvature | Thickness · Distance | Refractive Index (nd) | Abbe Number (νd) | hν | h̄ν |
|---|---|---|---|---|---|
| R18  55.637 | D18  0.846 | | | 2.373 | 0.187 |
| R19 −55.153 | D19  1 | n11  1.84666 | ν11  23.9 | 2.378 | 0.212 |
| R20  27.603 | D20  4.24 | n12  1.48749 | ν12  70.1 | 2.401 | 0.230 |
| R21 −15.512 | D21  0.15 | | | 2.612 | 0.333 |
| R22  111.951 | D22  3.41 | n13  1.60311 | ν13  60.7 | 2.610 | 0.337 |
| R23 −32.396 | | | | 2.563 | 0.388 |

In the above table, R3 is a non-spherical surface, while the non-spherical coefficients are as follows:
A = 0
B = 9.660 × 10$^{-6}$
C = 2.605 × 10$^{-9}$
D = 1.106 × 10$^{-11}$
E = 2.260 × 10$^{-14}$

| | Third Order Aberration Coefficients | | | |
|---|---|---|---|---|
| R | SA | CM | AS | PT | DS |
| 1 | 0.0080 | 0.0094 | 0.0109 | 0.1322 | 0.0131 |
| 2 | −0.1108 | 0.0381 | −10.0131 | −0.2300 | 0.0836 |
| 3 | 0.2215 | −0.1780 | 0.2682 | 0.0943 | −0.1264 |
| 4 | −0.0281 | −0.0380 | −0.0515 | −0.0910 | −0.1933 |
| 5 | 0.0933 | 0.0580 | 0.0361 | 0.1806 | 0.1349 |
| 6 | −1.3530 | 0.2046 | −0.0309 | −0.3735 | 0.0611 |
| 7 | 0.6407 | 0.1692 | 0.0447 | 0.1818 | 0.0598 |
| 8 | −5.0722 | 0.4171 | −0.0343 | −0.3804 | 0.0341 |
| 9 | 1.1410 | 0.3318 | 0.0965 | 0.0289 | 0.0364 |
| 10 | −2.6949 | 0.3425 | −0.0435 | −0.0387 | 0.0104 |
| 11 | −0.0104 | 0.0309 | −0.0917 | 0.1280 | −0.1075 |
| 12 | 1.5006 | 0.4068 | 0.1103 | 0.0867 | 0.0534 |
| 13 | 34.0270 | −4.7817 | 0.6719 | 0.3531 | −0.1440 |
| 14 | −43.2239 | 5.5665 | −0.7168 | −0.4914 | 0.1556 |
| 15 | 1.1038 | −0.3691 | 0.1234 | 0.2350 | −0.1198 |
| 16 | 0.0192 | 0.0272 | 0.0383 | 0.0418 | 0.1132 |
| 17 | 2.7195 | −0.0855 | 0.0026 | 0.0257 | −0.0008 |
| 18 | −0.2276 | −0.1557 | −0.1066 | −0.0988 | −0.1405 |
| 19 | −0.0609 | 0.0430 | −0.0303 | −0.1187 | 0.1051 |
| 20 | −6.0295 | −1.4431 | −0.3454 | −0.6776 | −0.0988 |
| 21 | 9.8725 | −0.2382 | 0.0057 | 0.3016 | −0.0074 |
| 22 | 0.0007 | 0.0014 | 0.0027 | 0.0479 | 0.0968 |
| 23 | 10.1839 | −0.3229 | 0.0102 | 0.1658 | −0.0055 |
| 1–23 | 2.7204 | 0.0343 | −0.0424 | 0.1138 | 0.1668 |

In the above table: SA = Spherical aberrations; CM = Coma; AS = Astigmatism; PT = Petzval's sum and DS = Distortion.

Figure 4:
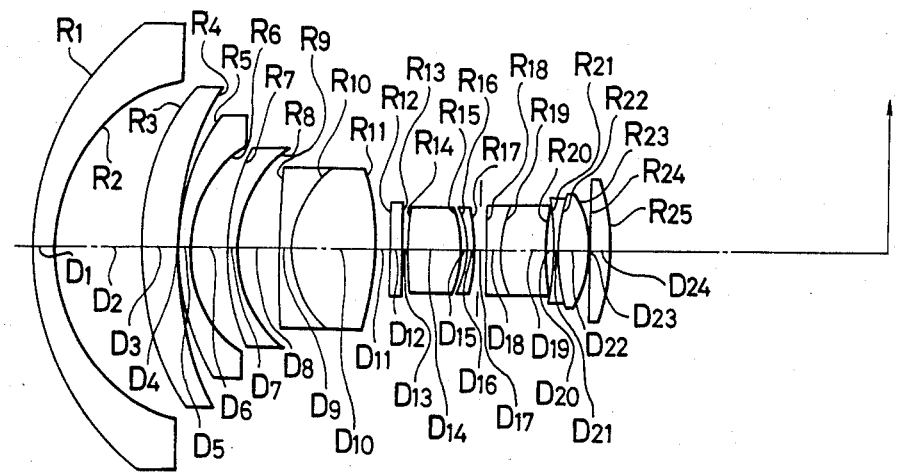
FIG. 4 shows a section of the second embodiment of the lens in accordance with the present invention.

FIG. 4 shows the second embodiment of the lens system in accordance with the present invention, whereby what is different from the lens construction in the first embodiment is that the non-spherical almost afocal lens in the first divergent lens group has a negative refractive power in paraxial value. The second embodiment in FIG. 3 and the third embodiment in FIG. 4 are shown in the state in which a filter is provided in the lens system, whereby this filter has nothing to do with the present invention. FIG. 5 shows the respective aberrations of the second embodiment. Below the data for the second embodiment will be given.

The second embodiment:
f = 14.2
bf = 36.3
F No. = 1:2.8
Angle of field = 114°

| Lens Group | Plane | Focal Distance |
|---|---|---|
| The first divergent lens group | | |
| The second convergent lens group | | |
| The 2-1st convergent lens group | R9–R17 | 3.24f |
| The 2-2nd convergent lens group | R18–R25 | 2.24f |

| Radius of Curvature | Thickness · Distance | Refractive Index (nd) | Abbe Number (νd) | hν | h̄ν |
|---|---|---|---|---|---|
| R 1  38.794 | D 1  3.1 | n 1  1.72 | ν 1  50.2 | 1.000 | −2.087 |
| R 2  24.997 | D 2  12.41 | | | 0.967 | −1.891 |
| R 3  58.28 | D 3  5.02 | n 2  1.6031 | ν 2  60.7 | 1.082 | −1.217 |
| R 4  46.009 | D 4  0.15 | | | 1.076 | −1.007 |
| R 5  33.022 | D 5  1.7 | n 3  1.6968 | ν 3  55.5 | 1.078 | −0.999 |
| R 6  17.647 | D 6  5.39 | | | 1.067 | −0.925 |
| R 7  32.787 | D 7  1.3 | n 4  1.7725 | ν 4  49.7 | 1.237 | −0.718 |
| R 8  17.218 | D 8  6.32 | | | 1.239 | −0.678 |
| R 9  266.96 | D 9  1.5 | n 5  1.6968 | ν 5  55.5 | 1.606 | −0.521 |
| R10  13.984 | D10  12.08 | n 6  1.60342 | ν 6  38 | 1.653 | −0.498 |
| R11 −43.016 | D11  2.2 | | | 2.142 | −0.326 |
| R12  ∞ | D12  1.8 | n 7  1.51633 | ν 7  64.1 | 2.219 | −0.266 |
| R13  ∞ | D13  0.8 | | | 2.260 | −0.233 |
| R14  74.564 | D14  7.84 | n 8  1.51118 | ν 8  51 | 2.288 | −0.211 |
| R15 −14.201 | D15  0.94 | | | 2.387 | −0.062 |
| R16  12.614 | D16  0.9 | n 9  1.7725 | ν 9  49.7 | 2.324 | −0.033 |
| R17 −26.958 | D17  1.7 | | | 2.363 | −0.018 |
| R18  129.909 | D18  2. | n10  1.64769 | ν10  33.8 | 2.376 | 0.033 |
| R19  12.278 | D19  6.9 | n11  1.69895 | ν11  30.1 | 2.371 | 0.068 |
| R20  50.377 | D20  0.83 | | | 2.315 | 0.187 |
| R21 −80.749 | D21  0.8 | n12  1.84666 | ν12  23.9 | 2.330 | 0.213 |
| R22  28.151 | D22  4.4 | n13  1.48749 | ν13  70.1 | 2.348 | 0.228 |
| R23 −15.466 | D23  0.15 | | | 2.563 | 0.337 |
| R24  493.467 | D24  2.85 | n14  1.7725 | ν14  49.7 | 2.562 | 0.341 |
| R25 −33.952 | | | | 2.542 | 0.382 |

In the above table, R3 is a non-spherical surface, whereby the non-spherical coefficients are as follows.

$A = 0$
$B = 9.556 \times 10^{-6}$
$C = 2.591 \times 10^{-9}$
$D = -1.015 \times 10^{-11}$
$E = 2.128 \times 10^{-14}$

| R | SA | CM | AS | PT | DS |
|---|---|---|---|---|---|
| 1 | 0.0121 | 0.0076 | 0.0048 | 0.1540 | 0.1000 |
| 2 | −0.1006 | 0.0447 | −0.0199 | −0.2391 | 0.1153 |
| 3 | 0.2082 | −0.1774 | 0.2678 | 0.0921 | −0.1087 |
| 4 | −0.0512 | −0.0457 | −0.0409 | −0.1167 | −0.1409 |
| 5 | 0.0999 | 0.0522 | 0.0272 | 0.1775 | 0.1070 |
| 6 | −0.9275 | 0.1422 | −0.0218 | −0.3322 | 0.0543 |
| 7 | 0.5331 | 0.1258 | 0.0297 | 0.1898 | 0.0518 |
| 8 | −3.4887 | 0.3912 | −0.0438 | −0.3614 | 0.0454 |
| 9 | 0.7537 | 0.2687 | 0.0958 | 0.0219 | 0.0420 |
| 10 | −2.0363 | 0.2743 | −0.0369 | −0.0350 | 0.0097 |
| 11 | −0.0134 | 0.0313 | −0.0731 | 0.1249 | −0.1209 |
| 12 | 0.1541 | 0.1212 | 0.0953 | 0.0000 | 0.0750 |
| 13 | −0.1569 | −0.1234 | −0.0971 | 0.0000 | −0.0764 |
| 14 | 0.7556 | 0.2833 | 0.1062 | 0.0647 | 0.0641 |
| 15 | 28.8193 | −4.3449 | 0.6550 | 0.3401 | −0.1500 |
| 16 | −38.7408 | 5.1916 | −0.6957 | −0.4933 | 0.1593 |
| 17 | 0.7093 | −0.2688 | 0.1018 | 0.2308 | −0.1261 |
| 18 | 0.0440 | 0.0502 | 0.0573 | 0.0432 | 0.1148 |
| 19 | 2.2778 | 0.2796 | 0.0343 | 0.0212 | 0.0068 |
| 20 | −0.6391 | −0.3529 | −0.1948 | −0.1166 | −0.1719 |
| 21 | 0.0043 | −0.0119 | 0.0327 | −0.0810 | 0.1320 |
| 22 | −5.3722 | −1.3352 | −0.3318 | −0.0663 | −0.0989 |
| 23 | 9.2513 | −0.2384 | 0.0061 | 0.3023 | −0.0079 |
| 24 | −0.0002 | 0.0025 | −0.0232 | 0.0126 | 0.0961 |
| 25 | 10.2818 | −0.4098 | 0.0163 | 0.1832 | −0.0079 |
| 1-25 | 2.3777 | −0.0416 | −0.0484 | 0.1172 | 0.1641 |

Figure 6:
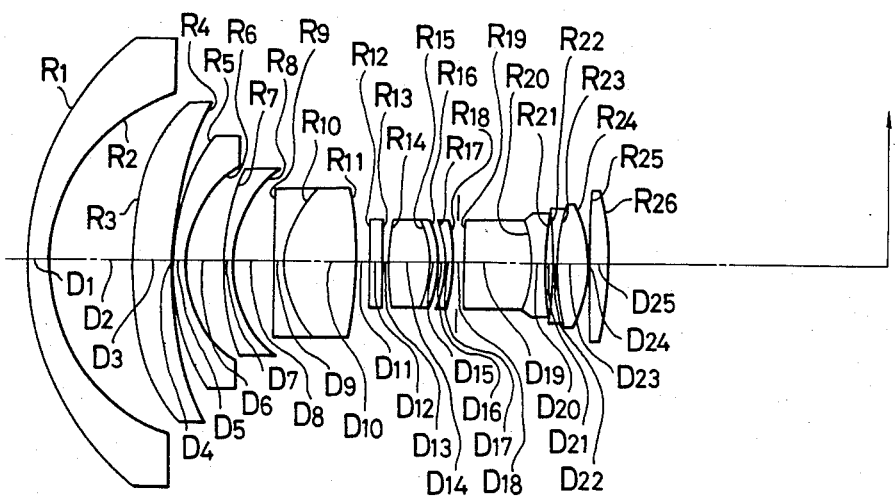
FIG. 6 shows a section of the third embodiment of the lens in accordance with the present invention.
Figure 7A:
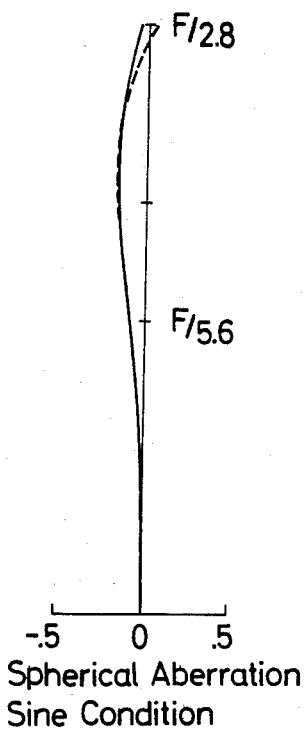
FIGS. 7A to 7E show respective aberrations of the third embodiment.
Figure 7B:
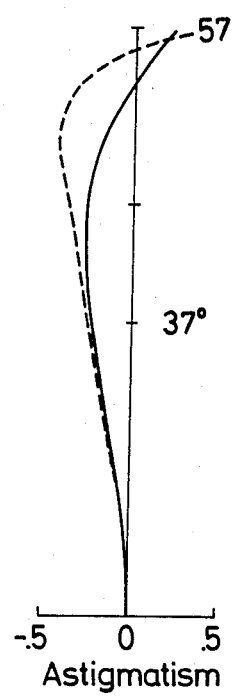
Figure 7C:
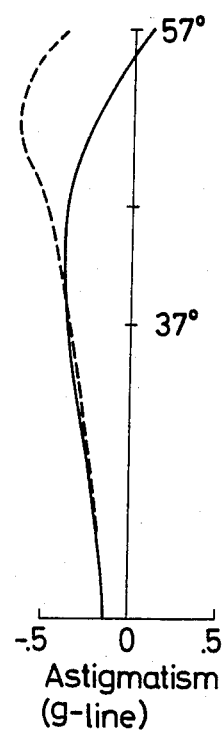
Figure 7D:
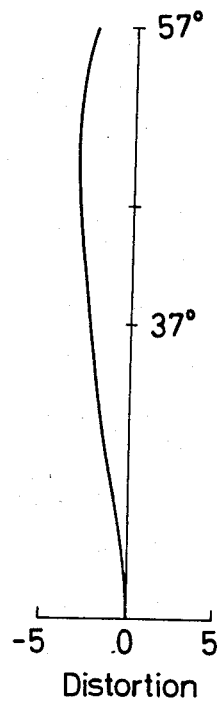
Figure 7E:
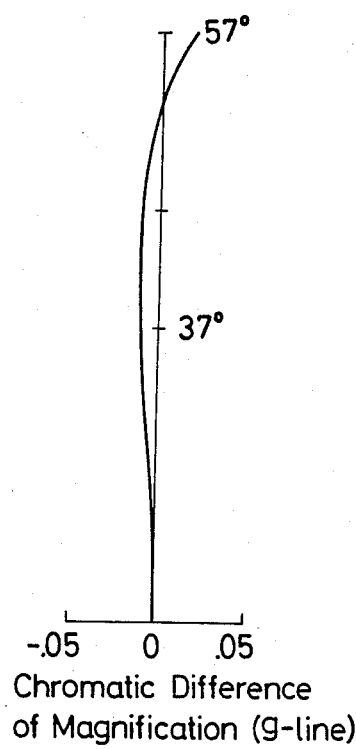

FIG. 6 shows the third embodiment of the lens system in accordance with the present invention, whereby the 2-1st convergent lens group is a little different from that of the afore mentioned second embodiment in such a manner that the 2-1st convergent lens group consists of a cemented lens (R9–R12) convex on both surfaces, a filter (R12, R13), a lens R14–R16) having a cemented divergent surface convex on the object side, convex on both surfaces, and a negative meniscus lens (R17, R18) convex on the image plane side in sequence from the object side. FIG. 7 shows the respective aberrations of the third embodiment. The data for the third embodiment are given below.

The third embodiment:
$f = 14.2$
$bf = 36.3$
$F\ No. = 1:2.8$
Angle of field $= 114°$

| Lens Group | Plane | Focal Distance |
|---|---|---|
| The first divergent lens group | R1–R8 | −1.15f |
| The second convergent lens group | | |
| The 2-1st convergent lens group | R9–R18 | 3.19f |
| The 2-2nd convergent lens group | R19–R26 | 2.30f |

| | Radius of Curvature | | Thickness · Distance | | Refractive Index (nd) | | Abbe Number (νd) | hν | h̄ν |
|---|---|---|---|---|---|---|---|---|---|
| R 1 | 41.022 | D 1 | 3.1 | n 1 | 1.6968 | ν 1 | 55.5 | 1.000 | −2.036 |
| R 2 | 25.486 | D 2 | 11.61 | | | | | 0.969 | −1.845 |
| R 3 | 59.586 | D 3 | 5.8 | n 2 | 1.60311 | ν 2 | 60.7 | 1.079 | −1.216 |
| R 4 | 53.247 | D 4 | 0.15 | | | | | 1.074 | −0.975 |
| R 5 | 31.755 | D 5 | 1.7 | n 3 | 1.6968 | ν 3 | 55.5 | 1.076 | −0.967 |
| R 6 | 16.408 | D 6 | 5.63 | | | | | 1.063 | −0.890 |
| R 7 | 32.689 | D 7 | 1.3 | n 4 | 1.7725 | ν 4 | 49.7 | 1.245 | −0.672 |
| R 8 | 16.569 | D 8 | 5.98 | | | | | 1.247 | −0.632 |
| R 9 | 327.3 | D 9 | 1.5 | n 5 | 1.6968 | ν 5 | 55.5 | 1.612 | −0.481 |
| R10 | 13.739 | D10 | 10.42 | n 6 | 1.60342 | ν 6 | 38 | 1.662 | −0.457 |
| R11 | −62.67 | D11 | 2.2 | | | | | 2.110 | −0.307 |
| R12 | ∞ | D12 | 1.8 | n 7 | 1.51633 | ν 7 | 64.1 | 2.217 | −0.249 |
| R13 | ∞ | D13 | 0.8 | | | | | 2.274 | −0.218 |
| R14 | 50.943 | D14 | 6.24 | n 8 | 1.51118 | ν 8 | 51 | 2.313 | −0.198 |
| R15 | −12.241 | D15 | 1. | n 9 | 1.6968 | ν 9 | 55.5 | 2.418 | −0.082 |
| R16 | −14.812 | D16 | 1.14 | | | | | 2.454 | −0.066 |
| R17 | −13.815 | D17 | 0.9 | n10 | 1.7725 | ν10 | 49.7 | 2.393 | −0.032 |
| R18 | −26.056 | D18 | 1.7 | | | | | 2.434 | −0.017 |
| R19 | 122.96 | D19 | 9.74 | n11 | 1.69895 | ν11 | 30.1 | 2.448 | 0.032 |
| R20 | −17.987 | D20 | 2.15 | n12 | 1.59551 | ν12 | 39.2 | 2.415 | 0.195 |
| R21 | 56.343 | D21 | 0.68 | | | | | 2.389 | 0.232 |
| R22 | −160.37 | D22 | 0.8 | n13 | 1.92286 | ν13 | 21.3 | 2.393 | 0.252 |
| R23 | 28.576 | D23 | 4.77 | n14 | 1.48749 | ν14 | 70.1 | 2.401 | 0.265 |
| R24 | −17.792 | D24 | 0.15 | | | | | 2.581 | 0.379 |
| R25 | 219.82 | D25 | 2.75 | n15 | 1.7725 | ν15 | 49.7 | 2.578 | 0.382 |
| R26 | −42.458 | | | | | | | 2.541 | 0.419 |

In the above table, R3 is the non-spherical surface, while the non-spherical coefficients are as follows:

$A = 0$
$B = 9.452 \times 10^{-6}$
$C = 2.539 \times 10^{-9}$
$D = -1.049 \times 10^{-11}$
$E = 2.118 \times 10^{-14}$

| R | SA | CM | AS | PT | DS |
|---|---|---|---|---|---|
| 1 | 0.0102 | 0.0085 | 0.0071 | 0.1429 | 0.1255 |
| 2 | −0.0982 | 0.0376 | −0.0144 | −0.2301 | 0.0937 |
| 3 | 0.2045 | −0.1737 | 0.2649 | 0.0901 | −0.1036 |
| 4 | −0.0338 | −0.0405 | −0.0486 | −0.1009 | −0.1794 |
| 5 | 0.0950 | 0.0531 | 0.0297 | 0.1847 | 0.1199 |
| 6 | −1.0724 | 0.1705 | −0.0271 | −0.3574 | 0.0611 |
| 7 | 0.5632 | 0.1462 | 0.0379 | 0.1904 | 0.0593 |
| 8 | −4.0525 | 0.3829 | −0.0361 | −0.3757 | 0.0389 |
| 9 | 0.8368 | 0.3018 | 0.1089 | 0.0179 | 0.0457 |
| 10 | −2.2738 | 0.2614 | −0.0300 | −0.0356 | 0.0075 |
| 11 | −0.0296 | −0.0617 | −0.1287 | 0.0857 | −0.0895 |
| 12 | 0.4177 | 0.2247 | 0.1209 | 0.0000 | 0.0650 |
| 13 | −0.4286 | −0.2305 | −0.1240 | 0.0000 | −0.0667 |
| 14 | 2.2290 | 0.5276 | 0.1248 | 0.0948 | 0.0520 |
| 15 | −5.4887 | 0.7668 | −0.1071 | −0.0844 | 0.0267 |
| 16 | 25.7670 | −4.0431 | 0.6344 | 0.3960 | −0.1616 |
| 17 | 28.3388 | 4.0296 | −0.5729 | −0.4506 | 0.1455 |
| 18 | 0.8953 | −0.3084 | 0.1062 | 0.2389 | −0.1189 |
| 19 | 0.0574 | 0.0591 | 0.0609 | 0.0477 | 0.1119 |

-continued-

| R | SA | CM | AS | PT | DS |
|---|---|---|---|---|---|
| 20 | 2.2028 | −0.0950 | 0.0041 | 0.0303 | −0.0014 |
| 21 | −0.2145 | −0.1517 | −0.1072 | −0.0946 | −0.1427 |
| 22 | 0.0002 | −0.0007 | 0.0022 | −0.0427 | 0.1236 |
| 23 | −4.5965 | −1.2485 | −0.3391 | −0.0760 | −0.1127 |
| 24 | 7.6797 | −0.1772 | 0.0040 | 0.2631 | −0.0061 |
| 25 | −0.0004 | 0.0042 | −0.032 | 0.0283 | 0.0894 |
| 26 | 7.8002 | −0.3682 | 0.0173 | 0.1466 | −0.0077 |
| 1−26 | 2.1310 | 0.0749 | −0.0501 | 0.1094 | 0.1754 |

Figure 8:
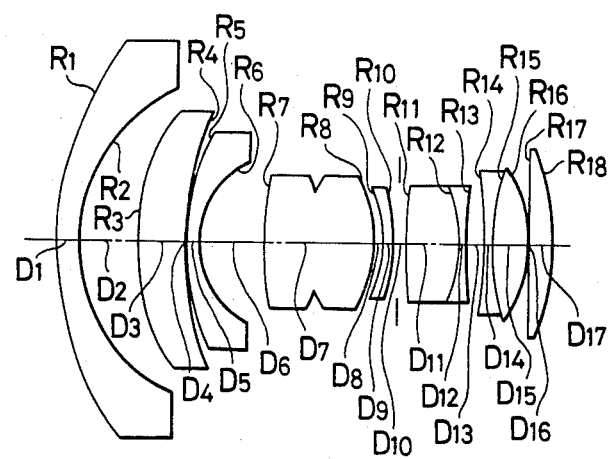
FIG. 8 shows a section of the fourth embodiment of the lens in accordance with the present invention.

FIG. 8 shows the fourth embodiment of the lens system in accordance with the present invention, whereby a negative meniscus lens (R1, R2) convex at the side of the object, an almost afocal meniscus lens (R3, R4) having a non-spherical surface (R3) and a surface convex at the object side, and a negative meniscus lens (R5, R6) convex at the object side are arranged in sequence from the object side, in such a manner that the first divergent lens group consists of the surfaces R1–R6. Behind this first divergent lens group, a lens (R7, R8) convex on both sides, a negative meniscus lens (R9, R10) concave at the object side, a diaphragm, a positive meniscus (R11–R13) having a divergent cemented surface concave at the image plane side, a positive meniscus lens (R14–R16) having a divergent cemented surface (R15) concave on the image side, convex at the image and a lens (R17–R18) convex at both surfaces are arranged in sequence from the object side. FIG. 9 shows the respective aberrations of the fourth embodiment. Below the data for the fourth embodiment will be given.

The fourth embodiment:
f = 17.34
bf = 36.61
F No. = 1:2.8
Angle of field = 104°

| Lens Group | Plane | Focal Distance |
|---|---|---|
| The first divergent lens group | R1–R6 | −0.93f |
| The second convergent lens group | | |
| The 2-1st convergent lens group | R7–R10 | 2.46f |
| The 2-2nd convergent lens group | R11–R18 | 1.54f |

| Radius of Curvature | Thickness · Distance | Refractive Index (nd) | Abbe Number (νd) | hν | h̄ν |
|---|---|---|---|---|---|
| R 1  36.562 | D 1  2.5 | n 1  1.6968  1  55.5 | | 1.000 | −1.133 |
| R 2  18.877 | D 2  6.76 | | | 0.972 | −1.016 |
| R 3  36.009 | D 3  5.31 | n 2  1.60311  2  60.7 | | 1.086 | −0.734 |
| R 4  36. | D 4  0.16 | | | 1.081 | −0.555 |
| R 5  26.936 | D 5  1.5 | n 3  1.6968  3  55.7 | | 1.084 | −0.548 |
| R 6  10.237 | D 6  7.52 | | | 1.074 | −0.496 |
| R 7  40.279 | D 7  12.62 | n 4  1.60342  4  38. | | 1.539 | −0.306 |
| R 8  −15.661 | D 8  1.116 | | | 1.844 | −0.072 |
| R 9  −13.1 | D 9  1. | n 5  1.7725  5  49.6 | | 1.808 | −0.036 |
| R10  −27.485 | D10  1.7 | | | 1.849 | −0.019 |
| R11  87.301 | D11  5.967 | n 6  1.69895  6  30.1 | | 1.887 | 0.034 |
| R12  −16.511 | D12  1. | n 7  1.59551  7  39.2 | | 1.913 | 0.142 |
| R13  123.783 | D13  1.788 | | | 1.910 | 0.160 |
| R14  −56.858 | D14  1. | n 8  1.92286  8  21.3 | | 1.918 | 0.215 |
| R15  27.983 | D15  4. | n 9  1.48749  9  70.1 | | 1.936 | 0.233 |
| R16  −15.574 | D16  0.15 | | | 2.113 | 0.334 |
| R17  1652.078 | D17  2.65 | n10  1.7725  10  49.6 | | 2.113 | 0.338 |
| R18  −29.01 | | | | 2.110 | 0.379 |

In the above table, R3 is the non-spherical surface, while the non-spherical coefficients are as follows:
A = 0
B = 2.530 × 10$^{-5}$
C = 1.505 × 10$^{-8}$
D = −2.012 × 10$^{-11}$
E = 2.102 × 10$^{-13}$

| R | SA | CM | AS | PT | DS |
|---|---|---|---|---|---|
| 1 | 0.0258 | 0.0252 | 0.0245 | 0.1948 | 0.2139 |
| 2 | −0.5546 | 0.0980 | −0.0173 | −0.3773 | 0.0697 |
| 3 | 1.1018 | −0.4995 | 0.4491 | 0.1812 | −0.1703 |
| 4 | −0.2133 | −0.1337 | −0.0838 | −0.1812 | −0.1661 |
| 5 | 0.3795 | 0.1625 | 0.0696 | 0.2644 | 0.1430 |
| 6 | −10.2347 | 1.4266 | −0.1988 | −0.6958 | 0.1247 |
| 7 | 3.7520 | 0.6590 | 0.1157 | 0.1620 | 0.0488 |
| 8 | 10.2507 | −2.5376 | 0.6282 | 0.4168 | −0.2587 |
| 9 | −15.2953 | 3.1676 | −0.6560 | −0.5770 | 0.2553 |
| 10 | 0.0258 | −0.0181 | 0.0127 | 0.2750 | −0.2024 |
| 11 | 0.3772 | 0.2689 | 0.1918 | 0.0817 | 0.1950 |
| 12 | 1.5692 | −0.1331 | 0.0112 | 0.0400 | −0.0043 |
| 13 | −0.0247 | −0.0396 | −0.0636 | −0.0523 | −0.1860 |
| 14 | −0.0446 | 0.0407 | −0.0372 | −0.1464 | 0.1678 |
| 15 | −5.7631 | −1.7107 | −0.5078 | −0.0943 | −0.1787 |
| 16 | 6.1583 | −0.2606 | 0.0110 | 0.3650 | −0.0159 |
| 17 | −0.0000 | −0.0000 | −0.0000 | 0.0045 | 0.1534 |
| 18 | 10.7117 | −0.3221 | 0.0096 | 0.2605 | −0.0081 |
| 1−18 | 2.2218 | 0.1934 | −0.0409 | 0.1218 | 0.1810 |

Figure 10:
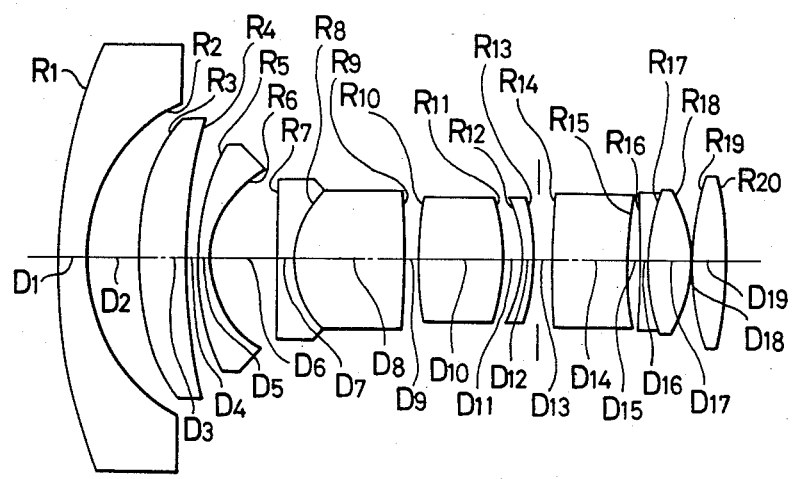
FIG. 10 shows a section of the fifth embodiment of the lens in accordance with the present invention.
Figure 9A:
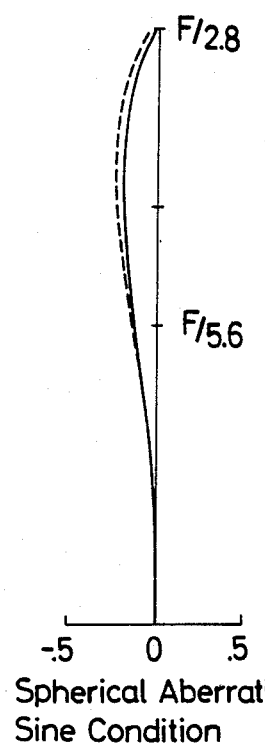
FIGS. 9A to 9E show respective aberrations of the fourth embodiment.
Figure 9B:
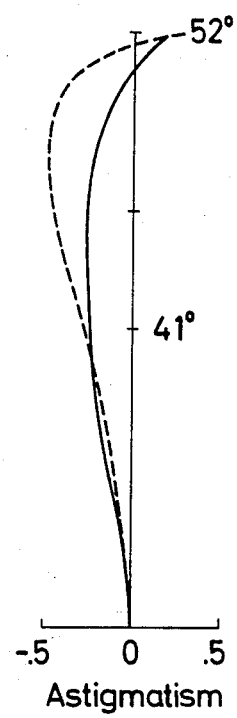
Figure 9C:
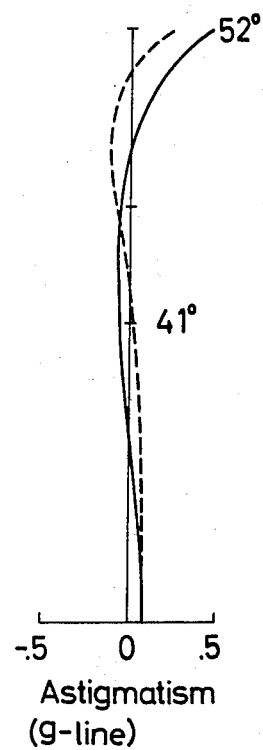
Figure 9D:
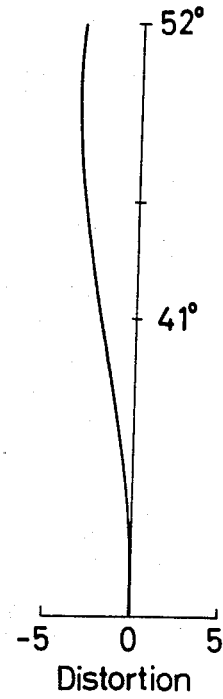
Figure 9E:
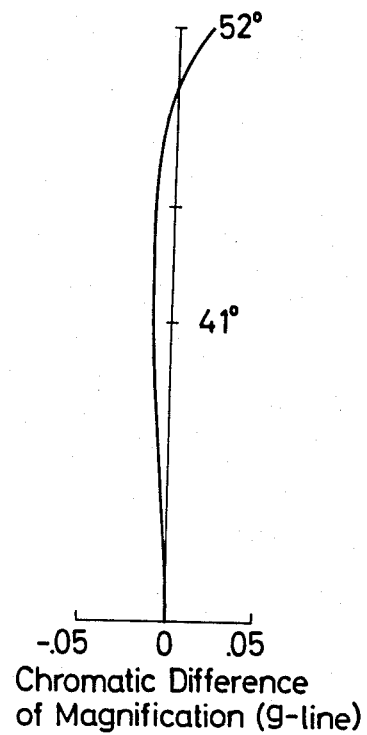
Figure 11A:
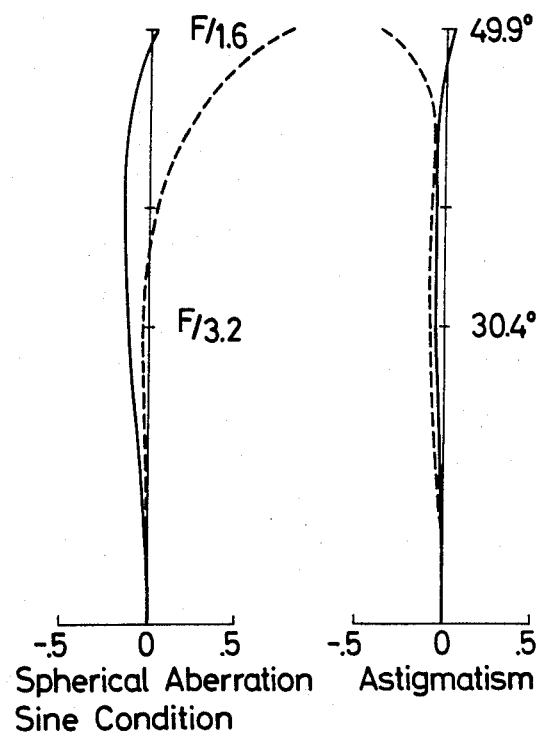
FIGS. 11A to 11E show respective aberrations of the fifth embodiment.
Figure 11B:
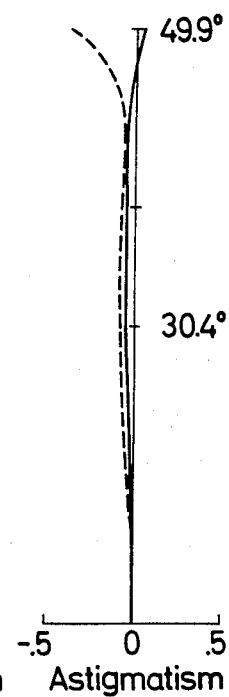
Figure 11C:
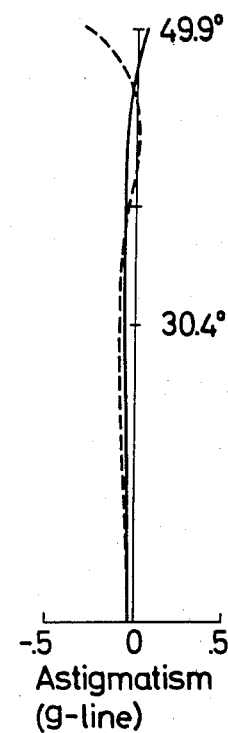
Figure 11D:
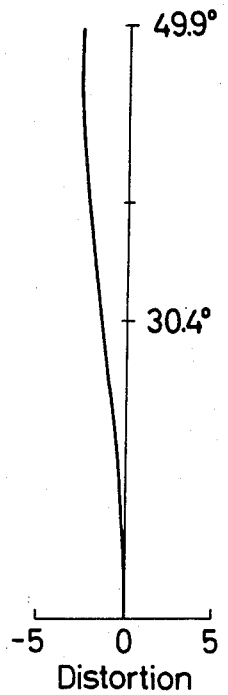
Figure 11E:
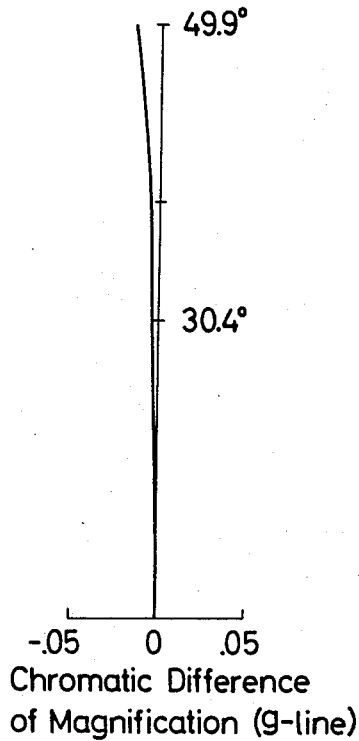

FIG. 10 shows the fifth embodiment of the lens system in accordance with the present invention, whereby the lens system consists of a negative meniscus lens (R1, R2) convex on the object side, a non-spherical positive meniscus lens of substantially zero first order power (R3, R4) and a negative meniscus lens (R5, R6) convex on the object side in sequence from the object side in such a manner that the first divergent lens group consists of the surfaces R1–R6. Behind the first divergent lens, a cemented lens (R7–R9) convex on both planes, a lens (R10, R11) convex on both surfaces, a negative meniscus lens (R12, R13) concave on the object side, a diaphragm, a negative meniscus lens (R14, R15) having a divergent surface concave on the image side and a convex surface on the object side, a positive meniscus lens (R16–R18) having a cemented divergent plane concave at the image side and a convex surface on the image side and a lens (R19, R20) convex on both sides and arranged in sequence from the object side in such a manner that the second convergent lens group consists of the surfaces R7–R20.

FIG. 11 shows the respective aberrations of the fifth embodiment. Below the data for the fifth embodiment will be given.

The fifth embodiment:
f = 5.52 bf=17.2
F No.=1:1.6
Angle of field=99.8°

| Lens Group | Plane | Focal Distance |
|---|---|---|
| The first divergent lens group | R1–R6 | −1.976f |
| The second convergent lens group | | |
| The 2-1st convergent lens group | R7–R13 | 7.22f |
| The 2-2nd convergent lens group | R14–R20 | 2.735f |

| | Radius of Curvature | | Thickness · Distance | | Refractive Index (nd) | | Abbe Number (νd) | hν | h̄ν |
|---|---|---|---|---|---|---|---|---|---|
| R 1 | 49.0189 | D 1 | 2.3 | n 1 | 1.6968 | ν 1 | 55.5 | 1.000 | −2.561 |
| R 2 | 15.0921 | D 2 | 4.48 | | | | | 0.981 | −2.266 |
| R 3 | 47.2056 | D 3 | 4 | n 2 | 1.60311 | ν 2 | 60.7 | 1.120 | −1.761 |
| R 4 | 47.2056 | D 4 | 1 | | | | | 1.162 | −1.423 |
| R 5 | 21.34 | D 5 | 1 | n 3 | 1.6968 | ν 3 | 55.5 | 1.193 | −1.305 |
| R 6 | 3.3649 | D 6 | 5.685 | | | | | 1.189 | −1.211 |
| R 7 | 514.905 | D 7 | 1.5 | n 4 | 1.6968 | ν 4 | 55.5 | 1.710 | −0.876 |
| R 8 | 7.745 | D 8 | 9.46 | n 5 | 1.60342 | ν 5 | 38 | 1.789 | −0.823 |
| R 9 | −139.463 | D 9 | 1.3 | | | | | 2.444 | −0.526 |
| R10 | 33.6069 | D10 | 7.295 | n 6 | 1.60342 | ν 6 | 38 | 2.574 | −0.458 |
| R11 | −16.1228 | D11 | 1.6 | | | | | 2.820 | −0.182 |
| R12 | −10.9129 | D12 | 1 | n 7 | 1.7725 | ν 7 | 49.6 | 2.738 | −0.073 |
| R13 | −18.1377 | D13 | 1.7 | | | | | 2.819 | −0.038 |
| R14 | 131.723 | D14 | 6.376 | n 8 | 1.59551 | ν 8 | 39.2 | 2.857 | 0.070 |
| R15 | 35.387 | D15 | 0.927 | | | | | 2.894 | 0.325 |
| R16 | −489.874 | D16 | 0.7 | n 9 | 1.92286 | ν 9 | 21.3 | 2.948 | 0.389 |
| R17 | 16.7027 | D17 | 3.684 | n10 | 1.48749 | ν10 | 70.1 | 2.971 | 0.414 |
| R18 | −11.9649 | D18 | 0.15 | | | | | 3.321 | 0.614 |
| R19 | 23.5946 | D19 | 2.925 | n11 | 1.7725 | ν11 | 49.6 | 3.322 | 0.622 |
| R20 | −31.1173 | | | | | | | 3.152 | 0.680 |

In the above table, R3 is the non-spherical surface, while the non-spherical coefficients are as follows:
A=0; B=1.111×10⁻⁴; C=−1.823×10⁻⁷
D=−6.583×10⁻¹¹; E=6.906×10⁻¹²

| R | SA | CM | AS | PT | DS |
|---|---|---|---|---|---|
| 1 | 0.0003 | 0.0021 | 0.0137 | 0.0462 | 0.3794 |
| 2 | −0.0547 | 0.0212 | −0.0082 | −0.1502 | 0.0614 |
| 3 | 0.1556 | −0.2037 | 0.3768 | 0.0439 | −0.4535 |
| 4 | −0.0154 | −0.0239 | −0.0371 | −0.0439 | −0.1257 |
| 5 | 0.0525 | 0.0336 | 0.0215 | 0.1062 | 0.0818 |
| 6 | −1.0302 | 0.3781 | −0.1387 | −0.2709 | 0.1503 |
| 7 | 0.1574 | 0.0949 | 0.0572 | 0.0044 | 0.0371 |
| 8 | −0.8444 | 0.2106 | −0.0525 | −0.0244 | 0.0192 |
| 9 | −0.1613 | −0.1096 | −0.0745 | 0.0148 | −0.0405 |
| 10 | 1.0751 | 0.2363 | 0.0519 | 0.0618 | 0.0250 |
| 11 | 1.7616 | −0.6133 | 0.2135 | 0.1288 | −0.1191 |
| 12 | −4.0727 | 1.0006 | −0.2458 | −0.2204 | 0.1145 |
| 13 | 0.1926 | −0.0956 | 0.0475 | 0.1326 | −0.0895 |
| 14 | 0.0173 | 0.0254 | 0.0372 | 0.0156 | 0.0775 |
| 15 | −0.5191 | −0.2904 | −0.1624 | −0.0582 | −0.1234 |
| 16 | 0.0551 | 0.0723 | 0.0947 | −0.0054 | 0.1170 |
| 17 | −3.8327 | −1.1101 | −0.3215 | −0.0503 | −0.1077 |
| 18 | 2.3896 | −0.0379 | 0.0006 | 0.1511 | −0.0024 |
| 19 | 0.4639 | 0.2594 | 0.1450 | 0.1019 | 0.1381 |
| 20 | 6.2774 | 0.0779 | 0.0009 | 0.0773 | 0.0009 |
| 1–20 | 2.0679 | −0.0720 | 0.0199 | 0.0611 | 0.1405 |

Figure 12:
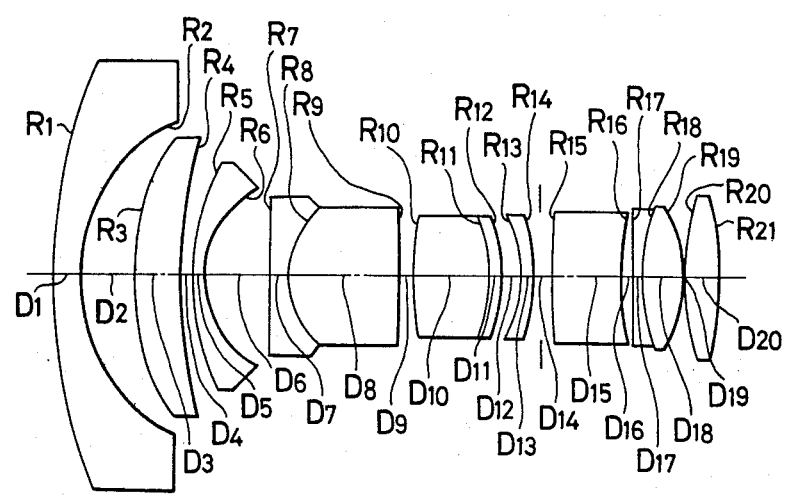
FIG. 12 shows a section of the sixth embodiment of the lens in accordance with the present invention.
Figure 13A:
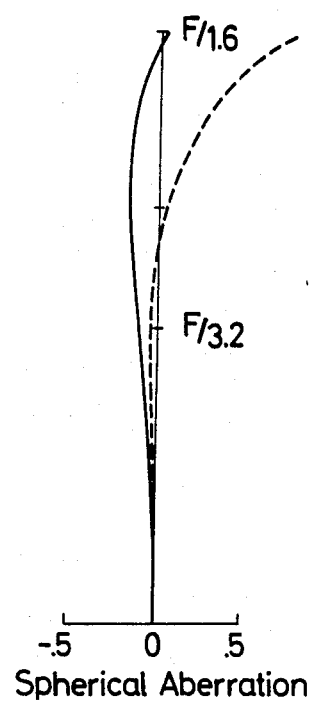
FIGS. 13A to 13E show respective aberrations of the sixth embodiment.
Figure 13B:
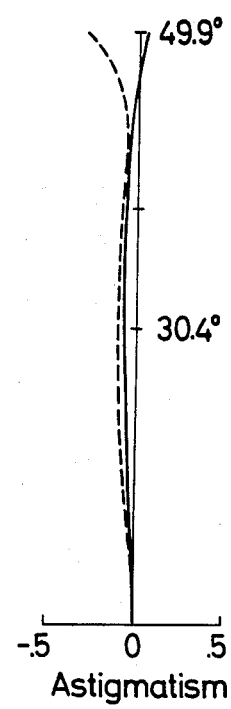
Figure 13C:
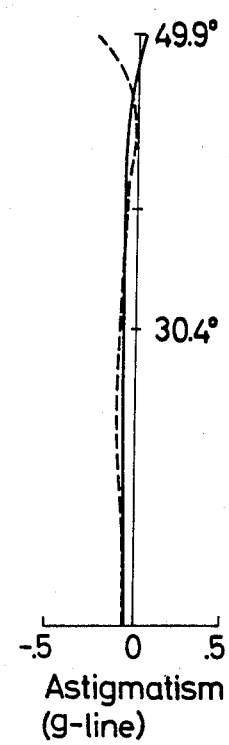
Figure 13D:
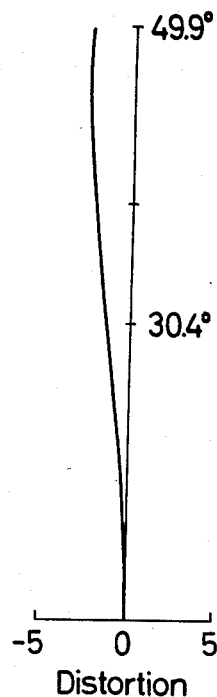
Figure 13E:
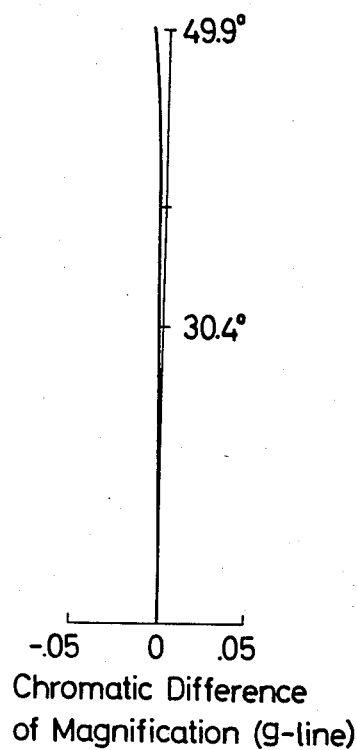

FIG. 12 shows the sixth embodiment of the lens system in accordance with the present invention, whereby what is different from the lens composition of the aforementioned fifth embodiment is that the negative meniscus lens concave on the object side, provided in the 2-1st divergent lens group consists of two lenses while the negative meniscus lens (R11, R12) provided on the object side is cemented with a lens (R10, R11) convex on both surfaces so as to form a cemented surface (R11). This surface (R11) serves as divergent surface with no air gap. FIG. 13 shows the respective aberrations of the sixth embodiment. Below the data for the sixth embodiment will be given.

The sixth embodiment:
f=5.52
bf=17.4
F No.=1:1.6
Angle of field=99.8°.

| Lens Group | Plane | Focal Distance |
|---|---|---|
| The first divergent lens group | R1–R6 | −1.991f |
| The second convergent lens group | | |
| The 2-1st convergent lens group | R7–R14 | 7.343f |
| The 2-2nd convergent lens group | R15–R21 | 2.738f |

| | Radius of Curvature | | Thickness · Distance | | Refractive Index (nd) | | Abbe Number (νd) | hν | h̄ν |
|---|---|---|---|---|---|---|---|---|---|
| R 1 | 47.3142 | D 1 | 2.3 | n 1 | 1.6968 | ν 1 | 55.5 | 1.000 | −2.582 |
| R 2 | 14.9039 | D 2 | 4.613 | | | | | 0.980 | −2.285 |
| R 3 | 46.113 | D 3 | 4 | n 2 | 1.60311 | ν 2 | 60.7 | 1.123 | −1.767 |
| R 4 | 46.113 | D 4 | 1 | | | | | 1.164 | −1.429 |
| R 5 | 21.4146 | D 5 | 1 | n 3 | 1.6968 | ν 3 | 55.5 | 1.196 | −1.312 |
| R 6 | 8.4483 | D 6 | 5.667 | | | | | 1.192 | −1.218 |
| R 7 | 577.663 | D 7 | 1.5 | n 4 | 1.6968 | ν 4 | 55.5 | 1.707 | −0.883 |
| R 8 | 7.603 | D 8 | 9.482 | n 5 | 1.60342 | ν 5 | 38 | 1.786 | −0.830 |
| R 9 | −220.61 | D 9 | 1.3 | | | | | 2.442 | −0.535 |
| R10 | 30.088 | D10 | 6.54 | n 6 | 1.60342 | ν 6 | 38 | 2.577 | −0.468 |
| R11 | −13.4264 | D11 | 1 | n 7 | 1.6968 | ν 7 | 55.5 | 2.791 | −0.221 |
| R12 | −16.0569 | D12 | 1.672 | | | | | 2.834 | −0.186 |
| R13 | −10.9266 | D13 | 1 | n 8 | 1.7725 | ν 8 | 49.6 | 2.748 | −0.073 |

-continued

| Radius of Curvature | Thickness Distance | | Refractive Index (nd) | | Abbe Number (νd) | hν | h̄ν |
|---|---|---|---|---|---|---|---|
| R14 | −18.0916 | D14 | 1.7 | | | 2.829 | −0.038 |
| R15 | 131.185 | D15 | 5.98 n 9 | 1.59551 ν 9 | 39.2 | 2.867 | 0.070 |
| R16 | 35.313 | D16 | 0.92 | | | 2.903 | 0.308 |
| R17 | −488.534 | D17 | 0.7 n10 | 1.92286 ν10 | 21.3 | 2.957 | 0.371 |
| R18 | 16.7051 | D18 | 3.605 n11 | 1.48749 ν11 | 70.1 | 2.980 | 0.396 |
| R19 | −11.9702 | D19 | 0.15 | | | 3.323 | 0.589 |
| R20 | 23.5131 | D20 | 2.961 n12 | 1.7725 ν12 | 49.6 | 3.324 | 0.597 |
| R21 | −31.1174 | | | | | 3.152 | 0.658 |

In the above table, R3 is the non-spherical surface, while the non-spherical coefficients are as follows.

$A = 0$
$B = 1.099 \times 10^{-4}$
$C = -1.747 \times 10^{-7}$
$D = -1.411 \times 10^{-11}$
$E = 6.880 \times 10^{-12}$

| R | SA | CM | AS | PT | DS |
|---|---|---|---|---|---|
| 1 | 0.0003 | 0.0023 | 0.0137 | 0.0479 | 0.3695 |
| 2 | −0.0559 | 0.0236 | −0.0100 | −0.1520 | 0.0685 |
| 3 | 0.1563 | −0.2041 | 0.3767 | 0.0450 | −0.4578 |
| 4 | −0.0159 | −0.0241 | −0.0364 | −0.0450 | −0.1228 |
| 5 | 0.0525 | 0.0333 | 0.0211 | 0.1058 | 0.0806 |
| 6 | −1.0096 | 0.3703 | −0.1358 | −0.2683 | 0.1482 |
| 7 | 0.1524 | 0.0932 | 0.0570 | 0.0039 | 0.0373 |
| 8 | −0.8737 | 0.2243 | −0.0576 | −0.0249 | 0.0211 |
| 9 | −0.2175 | −0.1256 | −0.0725 | 0.0094 | −0.0364 |
| 10 | 1.3089 | 0.2467 | 0.0465 | 0.0690 | 0.0217 |
| 11 | −0.1687 | 0.0523 | −0.0162 | −0.0141 | 0.0094 |
| 12 | 1.8761 | −0.6500 | 0.2252 | 0.1411 | −0.1269 |
| 13 | −4.0906 | 1.0001 | −0.2445 | −0.2201 | 0.1136 |
| 14 | 0.1975 | −0.0971 | 0.0477 | 0.1329 | −0.0888 |
| 15 | 0.0177 | 0.0257 | 0.0373 | 0.0157 | 0.0769 |
| 16 | −0.5277 | −0.2902 | −0.1595 | −0.0583 | −0.1198 |
| 17 | 0.0559 | 0.0725 | 0.0940 | −0.0054 | 0.1148 |
| 18 | −3.8777 | −1.0947 | −0.3090 | −0.0502 | −0.1014 |
| 19 | 2.3744 | −0.0562 | 0.0013 | 0.1511 | −0.0036 |
| 20 | 0.4762 | 0.2613 | 0.1434 | 0.1023 | 0.1348 |
| 21 | 6.2774 | 0.0322 | 0.0001 | 0.0773 | 0.0003 |
| 1−21 | 2.1083 | −0.1038 | 0.0227 | 0.0630 | 0.1394 |

The data in the aforementioned embodiments in accordance with the present invention form a principal part of the present invention. That is, the focal distances of the 12 lens groups (lens groups each including a non-spherical surface in the embodiments) of the aforementioned first divergent lens groups and the distance (L) between the diaphragm and the image side surface of the lens convex on both surfaces provided immediately in front of the object side surface of the negative meniscus lens concave on the object side, in the 2-1st convergent lens group are given in Table 1.

TABLE 1

| | Focal distance of the 12th lens group | L |
|---|---|---|
| The 1st embodiment | 90.5f | 0.179f |
| The 2nd embodiment | −30.2f | 0.172f |
| The 3rd embodiment | −89.1f | 0.256f |
| The 4th embodiment | −62.3f | 0.157f |
| The 5th embodiment | 444.79f | 0.58f |
| The 6th embodiment | 424.44f | 0.774f |

Table 2 shows the arrangements of the divergent parts provided on both sides of the diaphragm in the second convergent lens group for realizing a large aperture of the lens system, whereby the arrangement from the first to the sixth embodiment are given in the table. In Table 2, I shows the spherical aberration coefficients of the third order in the divergent parts.

TABLE 2

| | The 2-1st convergent lens group | | The 2-2nd convergent lens group | |
|---|---|---|---|---|
| | Divergent part | I | Divergent part | I |
| Embodiment 1 | R13 + R14 | −9.197 | R18 + R20 | −6.257 |
| Embodiment 2 | R15 + R16 | −9.921 | R20 + R22 | −6.011 |
| Embodiment 3 | R15 + R16 + R17 | −8.061 | R21 + R23 | −4.811 |
| Embodiment 4 | R8 + R9 | −5.045 | R13 + R15 | −5.788 |
| Embodiment 5 | R11 + R12 | −2.3111 | R15 + R17 | −4.3519 |
| Embodiment 6 | R11 + R12 + R13 | −2.382 | R16 + R18 | −4.409 |

Further according to the present invention, the meniscus lens element having a non-spherical surface of the 1-2st lens group may be made of a plastic material. This can provide a light-weight retro-focus type wide angle lens at a low manufacturing cost. As described hereinbefore, a plastic lens is susceptible to large thermal expansion and contraction, which produces adverse effects on the total focal length of the lens system and the back focus. Further, a plastic lens prepared by foaming has a poor surface accuracy, and tends to deteriorate the aberration.

In the retro-focus type wide angle lens according to the present invention, a non-spherical plastic lens having substantially a zero-first order-power is arranged immediately after the image surface side of a negative meniscus lens positioned closest to the object and having its convex surface toward the object. Thus, the non-spherical surface of the plastic lens is arranged opposing to the negative meniscus lens. Since the non-spherical plastic lens has substantially zero-first order-power, the adverse effects on the lens system caused by the thermal deformation of the plastic lens are relieved. Also the adverse effects are relieved by the fact that plastics generally show larger changes in refractive index due to changes in the temperatures than optical glass.

By the arrangement of the non-spherical surface immediately after the image surface of the negative meniscus lens positioned closest to the object, the effective diameter of the non-spherical lens can be increased. Therefore, the width of a light flux on and outside the axis, incident on the non-spherical surface is very small relative to the effective diameter of the non-spherical lens so that the effects on the aberration due to the deviation of the non-spherical surface of the plastic lens from an ideal surface are minimized.

Further, the divergency of the 1-1th divergent lens group of retro-focus type according to the present invention is not so strong, so that thus the width of the light beam on the optical axis, incident on the first surface and the width of the light beam incident on the non-spherical surface do not vary appreciably. Further, in the non-spherical lens, the width of the light beam on the optical axis does not change substantially, and the effect of changes in the thickness on the total focal distance and the back focus are very small. For example, when the thickness of the non-spherical lens in the eighth Embodiment set forth hereinafter changes 0.5 mm, the total focal distance changes only 0.02 mm and the back focus changes only 0.001 mm. The same thing can be said about the changes in the total focal length and the back focus due to the changes in the refractive index.

Still further, as the width of the light beam on and outside the optical axis is very small relative to the effective diameter of the non-spherical lens, it can be said that the effect on the aberration by the changes on the non-spherical surface is minimal. For this reason, it is possible to use a plastic lens, which generally has poor surface accuracy as compared with a glass lens, but can be easily formed, thereby making it possible to remarkably reduce the manufacturing cost.

As plastics have a very small specific gravity as compared with glass, the use of a plastic lens for a lens having a large effective diameter is very effective to reduce the weight of the whole lens system.

As the plastic material, acrylic plastics are preferable, because the chromatic aberration on axis is paraxially afocal and thus does not occur, but in the marginal portion the chromatic aberration due to magnification takes place because this portion has converging power. For this reason, a material having dispersion as low as possible is preferred and the acrylic plastics are most preferable.

In the embodiments set forth hereinafter, the 1-1th divergent lens group is composed of a negative meniscus lens having its convex surface on the object side, the 1-2th lens group is composed of a plastic meniscus lens having its non-spherical surface on the object side, and the 1-3th divergent lens group is composed of one or more negative meniscus lenses and has its convex surface on the object side.

In order to relieve the adverse effects caused by the plastic lens, the absolute value of the paraxial focal length of the non-spherical plastic lens is made more than 50 times larger than the effective total length of the retro-focus type wide angle lens, and the distance from the surface on the image side of the both convex lenses in the 2-1st convergent lens group to the diaphragm is limited to a range from 0.15 time to 0.35 times of the total focal length. However, the angle of field is designed to be not less than 102.7°.

Figure 14:
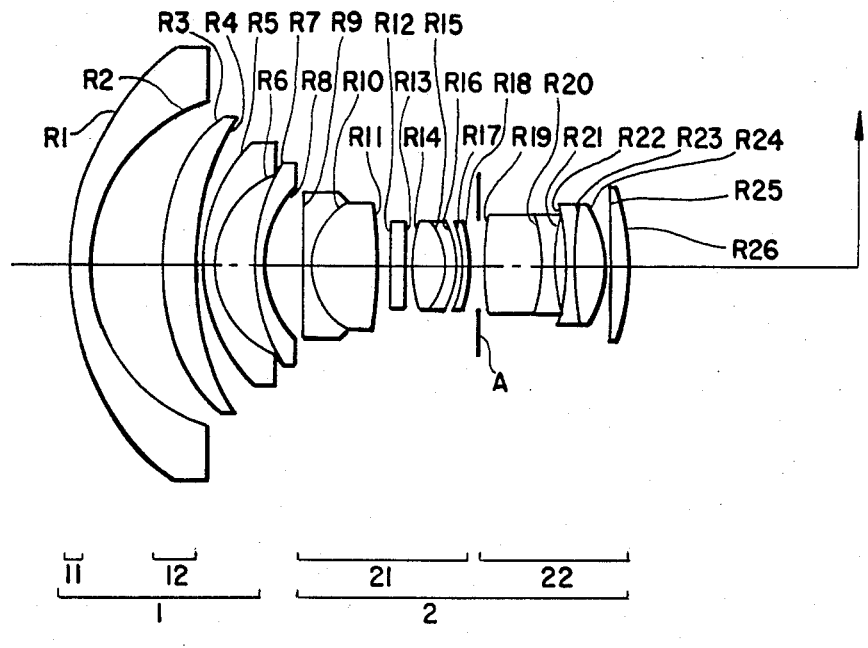
FIG. 14 shows a section of the seventh embodiment of the lens in accordance with the present invention.

Seventh Embodiment:

In FIG. 14 showing a cross sectional view a retrofocus wide angle type lens according to the present invention, R1–R8 surfaces form the first divergent lens group, R9–R26 surfaces form the second convergent lens group, R3 surface is non-spherical, and R3 and R4 surfaces are surfaces of the plastic lens. R1–R2 surfaces correspond to the 1-1th meniscus lens, R3–R4 surfaces correspond to the 1-2th meniscus lens, R9–R18 correspond to the 2-1st convergent lens group, and R19–R26 surfaces correspond to the 2-2nd convergent lens group. A is a diaphragm.

| Radius of Curvature | Thickness & Distance | Refractive Index (nd) | Abbe Number (νd) |
|---|---|---|---|
| R 1   42.889 | D 1   3.1   N 1 | 1.6968   ν 1 | 55.5 |
| R 2   26.161 | D 2   11.55 | | |
| R 3   61.567 | D 3   5.83  N 2 | *1.493   ν 2 | 54.2 |
| R 4   57.577 | D 4   0.15 | | |
| R 5   30.956 | D 5   1.7   N 3 | 1.6968   ν 3 | 55.5 |
| R 6   16.443 | D 6   5.75 | | |
| R 7   32.978 | D 7   1.3   N 4 | 1.7725   ν 4 | 49.6 |
| R 8   16.486 | D 8   5.95 | | |
| R 9   357.247 | D 9   1.5   N 5 | 1.6968   ν 5 | 55.5 |
| R10   12.444 | D10   10.4  N 6 | 1.60342  ν 6 | 38 |
| R11   −55.993 | D11   2.53 | | |
| R12   ∞ | D12   1.8   N 7 | 1.51633  ν 7 | 64.1 |
| R13   ∞ | D13   0.7 | | |
| R14   49.441 | D14   5.6   N 8 | 1.51742  ν 8 | 52.3 |
| R15   −12.228 | D15   1.5   N 9 | 1.6968   ν 9 | 55.5 |
| R16   −14.588 | D16   1.08 | | |
| R17   −13.862 | D17   0.9   N10 | 1.7725   ν10 | 49.6 |
| R18   −25.881 | D18   1.7 | | |
| R19   136.4 | D19   9.65  N11 | 1.68893  ν11 | 31.1 |
| R20   −21.198 | D20   1.9   N12 | 1.59551  ν12 | 39.2 |
| R21   54.226 | D21   0.69 | | |
| R22   −160.011 | D22   0.8   N13 | 1.92286  ν13 | 21.3 |
| R23   28.566 | D23   5.53  N14 | 1.48749  ν14 | 70.1 |
| R24   −17.829 | D24   0.1 | | |
| R25   277.71 | D25   2.63  N15 | 1.804    ν15 | 46.6 |
| R26   −43.605 | | | |

In the above table, R3 is the non-spherical surface, while the non-spherical coefficients are as follows:

$A = 0$;
$B = 1.07336 \times 10^{-5}$;
$C = 5.38038 \times 10^{-9}$
$D = -1.98246 \times 10^{-11}$
$E = 3.65339 \times 10^{-14}$
$f = 14.2$;
F No. $= 1:2.8$;
$bf = 36.1$
Angle of field $= 113.4°$ Paraxial Focal Distance of the non-spherical lens (R3, R4): $-265\,f$ Distance on axis between the surface R and the diaphragm A: $0.30\,f$ FIG. 15 shows the aberrations of the lens shown in FIG. 14, and the values of aberration coefficients are shown below.

| | SA | CM | AS | PT | DS |
|---|---|---|---|---|---|
| R1 | 0.0089 | 0.0086 | 0.0082 | 0.1368 | 0.1395 |
| R2 | −0.0940 | 0.0341 | −0.0124 | −0.2243 | 0.0860 |
| R3 | 0.1901 | −0.1654 | 0.2515 | 0.0766 | −0.1117 |
| R4 | −0.0262 | −0.0344 | −0.0453 | −0.0819 | −0.1672 |
| R5 | 0.0987 | 0.0519 | 0.0272 | 0.1895 | 0.1139 |
| R6 | −1.0512 | 0.1666 | −0.0264 | −0.3568 | 0.0607 |
| R7 | 0.5346 | 0.1458 | 0.0397 | 0.1888 | 0.0623 |
| R8 | −4.0937 | 0.3852 | −0.0362 | −0.3777 | 0.0389 |
| R9 | 0.8115 | 0.2994 | 0.1105 | 0.0164 | 0.0468 |
| R10 | −2.8478 | 0.3591 | −0.0452 | −0.0394 | 0.0106 |
| R11 | −0.0106 | −0.0362 | −0.1236 | 0.0960 | −0.0939 |
| R12 | 0.3859 | 0.2145 | 0.1193 | 0.0000 | 0.0663 |
| R13 | −0.3955 | −0.2199 | −0.1222 | 0.0000 | −0.0679 |
| R14 | 2.2408 | 0.5310 | 0.1258 | 0.0985 | 0.0531 |
| R15 | −5.5306 | 0.7824 | −0.1107 | −0.0814 | 0.0271 |
| R16 | 29.7855 | −4.4844 | 0.6751 | 0.4022 | −0.1622 |
| R17 | −31.3770 | 4.3542 | −0.6042 | −0.4492 | 0.1461 |
| R18 | 1.3486 | −0.4280 | 0.1358 | 0.2406 | −0.1194 |
| R19 | 0.0140 | 0.0210 | 0.0314 | 0.0427 | 0.1110 |
| R20 | 1.2688 | −0.0827 | 0.0053 | 0.0233 | −0.0018 |
| R21 | −0.2020 | −0.1453 | −0.1045 | −0.0983 | −0.1459 |
| R22 | −0.0002 | 0.0007 | −0.0021 | −0.0428 | 0.1264 |
| R23 | −4.2175 | −1.1740 | −0.3268 | −0.0761 | −0.1121 |
| R24 | 7.7045 | −0.1320 | 0.0022 | 0.2626 | −0.0045 |
| R25 | −0.0030 | 0.0116 | −0.0454 | 0.0229 | 0.0872 |
| R26 | 7.5725 | −0.3468 | 0.0158 | 0.1460 | −0.0074 |
| Σ | 2.1151 | 0.1171 | −0.0569 | 0.1151 | 0.1820 |

In the above table: SA=Spherical aberrations; CM=Coma; AS=Astigmatism; PT=Petzval's sum and DS=Distortion.

Figure 16:
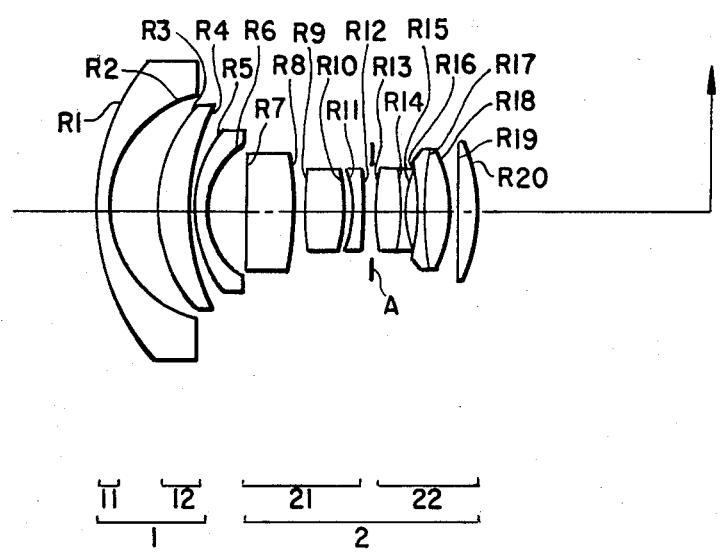
FIG. 16 shows a section of the eighth embodiment of the lens in accordance with the present invention.

Eighth Embodiment:

In FIG. 16 showing a still another embodiment retro-focus wide angle lens according to the present invention, R1-R6 surfaces form the first divergent lens group, R7-R20 surfaces the second convergent lens group, A is a diaphragm, R3 surface is non-spherical, R3-R4 surfaces are surfaces of a plastic lens, R1-R2 surfaces correspond to the 1-1th meniscus lens, R3-R4 surfaces correspond to the 2-1th meniscus lens, R7-R12 surfaces correspond to the 2-1st convergent lens group and, R13-R20 surfaces correspond to the 2-2nd convergent lens group.

f = 17.3;
F No. = 1:2.8;
bf = 36.2;
Angle of field = 102.7°
R3—non-spherical surface
A = 0
B = 2.51989 × 10$^{-5}$
C = 2.25528 × 10$^{-8}$
D = −2.51574 × 10$^{-11}$
E = 3.21205 × 10$^{-13}$

| | Radius of Curvature | | Thickness · Distance | Refractive Index (nd) | | Abbe Number (νd) |
|---|---|---|---|---|---|---|
| R 1 | 35.43 | D 1 | 2.5 | N 1 | 1.6968 ν 1 | 55.5 |
| R 2 | 17.531 | D 2 | 6.8 | | | |
| R 3 | 35.8 | D 3 | 5.3 | N 2 | *1.493 ν 2 | 54.2 |
| R 4 | 36.5 | D 4 | 0.15 | | | |
| R 5 | 21.591 | D 5 | 1.5 | N 3 | 1.6968 ν 3 | 55.5 |
| R 6 | 10.2174 | D 6 | 6. | | | |
| R 7 | 300. | D 7 | 8. | N 4 | 1.60342 ν 4 | 38. |
| R 8 | −46.177 | D 8 | 1.5 | | | |
| R 9 | 124.799 | D 9 | 7. | N 5 | 1.60342 ν 5 | 38. |
| R10 | −14.3706 | D10 | 1.1 | | | |
| R11 | −13.0615 | D11 | 1. | N 6 | 1.6968 ν 6 | 55.5 |
| R12 | −36.637 | D12 | 2.3 | | | |
| R13 | 67.788 | D13 | 3.7 | N 7 | 1.6968 ν 7 | 30.1 |
| R14 | −129.82 | D14 | 1. | N 8 | 1.66672 ν 8 | 48.3 |
| R15 | 55.651 | D15 | 1.2 | | | |
| R16 | −51.303 | D16 | 1. | N 9 | 1.92286 ν 9 | 21.3 |
| R17 | 29.3603 | D17 | 4.5 | N10 | 1.48749 ν10 | 70.1 |
| R18 | −15.9063 | D18 | 0.15 | | | |
| R19 | −340.986 | D19 | 3.2 | N11 | 1.7725 11 | 49.6 |
| R20 | −23.448 | | | | | |

Paraxial focal distance of non-spherical lens (R3, R4): 62f

Distance on axis between the surface R and the diaphragm A: 0.19f

| | SA | CM | AS | PT | DS |
|---|---|---|---|---|---|
| R1 | 0.0283 | 0.0253 | 0.0226 | 0.2009 | 0.1998 |
| R2 | −0.7201 | 0.1892 | −0.0497 | −0.4061 | 0.1198 |
| R3 | 1.0013 | −0.4385 | 0.3976 | 0.1599 | −0.1848 |
| R4 | −0.2416 | −0.1263 | −0.0661 | −0.1568 | −0.1166 |
| R5 | 0.7170 | 0.1523 | 0.0323 | 0.3297 | 0.0769 |
| R6 | −10.0498 | 1.6351 | −0.2660 | −0.6969 | 0.1566 |
| R7 | 1.0832 | 0.4042 | 0.1508 | 0.0217 | 0.0644 |
| R8 | −0.0023 | 0.0164 | −0.1163 | 0.1413 | −0.1766 |
| R9 | 0.4653 | 0.2698 | 0.1564 | 0.0522 | 0.1210 |
| R10 | 21.5413 | −4.4879 | 0.9350 | 0.4540 | −0.2894 |
| R11 | −24.6732 | 4.6320 | −0.8695 | −0.5451 | 0.2655 |
| R12 | 0.1360 | −0.1005 | 0.0742 | 0.1943 | −0.1984 |
| R13 | 0.1278 | 0.1188 | 0.1105 | 0.1052 | 0.2005 |
| R14 | 0.0040 | −0.0033 | 0.0026 | 0.0015 | −0.0034 |
| R15 | −0.2300 | −0.1902 | −0.1573 | −0.1246 | −0.2332 |
| R16 | −0.0146 | 0.0160 | −0.0175 | −0.1622 | 0.1966 |
| R17 | −5.2023 | −1.5200 | −0.4441 | −0.0898 | −0.1560 |
| R18 | 4.1219 | −0.3231 | 0.0253 | 0.3572 | −0.0299 |
| R19 | 0.0000 | 0.0002 | 0.0241 | −0.0221 | 0.1671 |

-continued

| | SA | CM | AS | PT | DS |
|---|---|---|---|---|---|
| R20 | 14.3171 | −0.2084 | 0.0030 | 0.3223 | −0.0047 |
| Σ | 2.4096 | 0.0612 | −0.0518 | 0.1367 | 0.1753 |

FIG. 17 shows the aberrations of the lens shown in FIG. 16 and their numerical data are shown in the above mentioned table.

What is claimed is:

1. A retro-focus type wide angle lens for forming an image of an object at an image plane comprising:
a divergent lens group including:
two sets of sub-lens groups each consisting of at least one first meniscus lens having a negative refractive power and a surface convex on the object side; and
a lens group arranged between said two sets of sub-lens groups and comprising meniscus lens convex on the object side, the surface of the lens group closest to the object being non-spherical for distortion compensation; and
a convergent lens group on the image side against said divergent lens group including:
a front lens group including a diaphragm, a second negative meniscus lens concave on the object side, and a biconvex lens in sequence from the diaphragm to the object so as to form a divergent air lens between said second negative meniscus lens and said biconvex lens; and
a rear lens group having a plural number of lens surfaces and provided on the image side with reference to the diaphragm, at least one of said lens surfaces being concave on the image side.

2. A retro-focus type wide angle lens in accordance with claim 1, wherein said non-spherical surface is so formed that the more distant it is from the optical axis of the lens system, the greater the deviation from an ideal spherical surface, the radius of the paraxial curvature being larger than the radius of curvature of the surface next to the non-spherical surface at the object side.

3. A retro-focus type wide angle lens in accordance with claim 2, wherein the absolute value paraxial focal length of the lens having said non-spherical surface is larger than twenty-five times the effective total focal length of the wide angle lens.

4. A retro-focus type wide angle lens in accordance with claim 1, wherein the distance between the diaphragm and the image side of the biconvex lens in said front lens group is larger than 0.15 times the effective focal length of the wide angle lens but smaller than 0.85 times said effective focal length.

5. A retro-focus type wide angle lens in accordance with claim 4, wherein the front lens group consists, in sequence from the diaphragm to the object side of said negative meniscus lens said biconvex lens, and a further biconvex lens which consists of a negative lens and a positive lens cemented to each other.

6. A retro-focus type wide angle lens in accordance with claim 1, wherein said rear lens group consists, in sequence from the diaphragm to the image side, of a meniscus lens consisting of two lenses cemented to each other, whereby the object side lens of said cemented meniscus lens is biconvex and the image side lens of said cemented meniscus lens is biconcave, and a further meniscus lens consisting of two further lenses cemented to each other, whereby the object side further lens is biconcave and the image side further lens is biconvex, and a biconvex lens.

7. A retro-focus type wide angle lens in accordance with claim 1, wherein said rear lens group consists, in sequence from the diaphragm to the image side, of a meniscus lens consisting of two meniscus lenses cemented to each other both being convex on the object side, a further meniscus lens consisting of two further lenses, whereby the further lens on the object side is biconvex and the further lens on the image side is biconvex, and a biconvex lens.

8. A retro-focus type wide angle lens in accordance with claim 1, wherein said rear lens group consists, in sequence from the diaphragm to the image side, of a negative meniscus lens being convex on the object side, a further negative meniscus lens consisting of two further lenses cemented to each other, whereby the further lens on the object side is biconcave and the lens on the image side is biconvex, and a biconvex lens.

9. A retro-focus type wide angle lens comprising:
a diaphragm; and
a front lens group on the object side of the diaphragm comprising:
   a negative meniscus lens convex on the object side;
   a meniscus lens of substantially zero first order power, having a convex non-spherical surface on the object side;
   a negative meniscus lens group having at least one meniscus lens convex on the subject side;
   a convergent lens group next to said negative meniscus lens group, including a lens pair which consists of a biconvex lens on the object side, and a negative meniscus lens concave on the object side and located on the image side in sequence form the object side immediately up to the diaphragm; and
a rear lens group on the image side of the diaphragm comprising:
   a first meniscus lens concave on the image side;
   a second positive meniscus lens convex on the image side and having a divergent cemented surface concave on the image side; and
   a biconvex lens, in sequence from the object side.

10. A retro-focus type wide angle lens in accordance with claim 9, wherein said non-spherical surface has a deviation from a hypothetical spherical surface, which deviation increases toward the circumferential portions of the lens from the optical axis, while the radius of the paraxial curvature of the non-spherical surface is larger than the radius of curvature of the surface next to the non-spherical surface on the object side.

11. A retro-focus type wide angle lens in accordance with claim 9, wherein the distance between the diaphragm and the image side surface of said biconvex lens included in said convergent lens group in said front lens group is larger than 0.15 times the effective focal length of the wide angle lens but smaller than 0.85 times said effective focal length.

12. A retro-focus type wide angle lens in accordance with claim 9, wherein said convergent lens group in said front lens group consists of said lens pair, and further a biconvex lens consisting of a positive lens and a negative lens cemented to each other.

13. A retro-focus type wide angle lens in accordance with claim 9, wherein said first meniscus lens in said rear lens groups is a lens consisting of a biconvex lens on the object side and a biconcave lens on the image side cemented to each other.

14. A retro-focus type wide angle lens in accordance with claim 9, wherein said first meniscus lens in said rear lens group is a meniscus lens consisting of two meniscus lenses both having a convex surface on the object side, said two meniscus lenses being cemented to each other.

15. A retro-focus type wide angle lens in accordance with claim 1 or 9, wherein the meniscus lens having said non-spherical surface is formed from plastic material.

16. A retro-focus type wide angle lens in accordance with claim 15, wherein said non-spherical surface is so formed that the more distant it is from the optical axis of the lens system, the greater the deviation from the spherical, the radius of the paraxial curvature being larger than the radius of curvature of the surface next to the non-spherical surface on the object side.

17. A retro-focus type wide angle lens in accordance with claim 16, wherein the absolute value paraxial focal length of the lens having said non-spherical surface is larger than 50 times the effective total focal length of the wide angle lens.

18. A retro-focus type wide angle lens in accordance with claim 15, wherein the distance between the diaphragm and the image side surface of the biconvex lens in said front lens group is larger than 0.15 times the effective focal length of the wide angle lens but smaller than 0.35 times said effective focal length.

19. A retro-focus type wide angle lens in accordance with claim 15, wherein said rear lens group consists, in sequence from said diaphragm to the image side, of a meniscus lens consisting of two lenses cemented to each other, whereby the object side lens of said cemented meniscus lens is biconvex and the image side lens of said cemented meniscus lens is biconcave and a further meniscus lens consisting of two further lenses cemented to each other, whereby the object side further lens is biconcave and the image side further lens is biconvex, and a biconvex lens.

* * * * *